(12) United States Patent
Boden et al.

(10) Patent No.: US 11,148,486 B2
(45) Date of Patent: Oct. 19, 2021

(54) METHOD OF IMPROVING PNEUMATIC TIRE VIBRATION CHARACTERISTICS

(71) Applicant: FORD GLOBAL TECHNOLOGIES, LLC, Dearborn, MI (US)

(72) Inventors: Arne Boden, Moenchengladbach (DE); David Scott Rohweder, Troy, MI (US); Arne Heyden, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 323 days.

(21) Appl. No.: 16/179,189

(22) Filed: Nov. 2, 2018

(65) Prior Publication Data
US 2019/0126696 A1 May 2, 2019

(30) Foreign Application Priority Data

Nov. 2, 2017 (DE) ...................... 10 2017 219 519.3

(51) Int. Cl.
*G01M 17/02* (2006.01)
*B60C 99/00* (2006.01)
(Continued)

(52) U.S. Cl.
CPC .............. *B60C 99/006* (2013.01); *B60C 9/18* (2013.01); *G01H 13/00* (2013.01); *G01M 17/02* (2013.01);
(Continued)

(58) Field of Classification Search
None
See application file for complete search history.

(56) References Cited

U.S. PATENT DOCUMENTS

| 5,885,388 A | 3/1999 | Ueyoko et al. |
| 5,909,757 A | 6/1999 | Kakumu et al. |

(Continued)

FOREIGN PATENT DOCUMENTS

| DE | 60022792 T2 | 6/2006 |
| DE | 102013222758 A1 | 6/2014 |

(Continued)

OTHER PUBLICATIONS

The tyre Mechanical and acoustic comfort. (2002). Clermont-Ferrand, France: Société de Technologie Michelin. (Year: 2002).*

(Continued)

*Primary Examiner* — Alexander A Mercado
(74) *Attorney, Agent, or Firm* — Raymond L. Coppiellie; Brooks Kushman P.C.

(57) ABSTRACT

A method for designing a pneumatic tire to have improved vibration characteristics. Dynamic testing of the tire detects a) respective frequencies of a plurality of radial vibration modes of the tire, and b) respective frequencies of a plurality of torsional vibration modes of the tire. The testing may determine that a first interval between the frequency of an even-numbered radial vibration mode and the frequency of an even-numbered torsional vibration mode is less than a first threshold, and/or may determine that a second interval between the frequency of an odd-numbered radial vibration mode and the frequency of an odd-numbered torsional vibration mode is less than a second threshold. One or more design parameter of the tire is/are modified to increase at least one of first interval and the second interval to the respective first or second threshold.

7 Claims, 13 Drawing Sheets

(51) Int. Cl.
*B60C 9/18* (2006.01)
*G01H 13/00* (2006.01)
B60C 19/00 (2006.01)
B60C 9/20 (2006.01)

(52) U.S. Cl.
CPC ..... *G01M 17/025* (2013.01); *B60B 2900/131* (2013.01); *B60C 19/002* (2013.01); *B60C 2009/2012* (2013.01)

(56) References Cited

U.S. PATENT DOCUMENTS

| | | | |
|---|---|---|---|
| 6,327,904 | B1 | 12/2001 | Oldenettel |
| 7,073,382 | B2 | 7/2006 | Tsihlas et al. |
| 7,213,451 | B2 | 5/2007 | Zhu et al. |
| 9,121,790 | B2 | 9/2015 | Oblizajek et al. |
| 9,329,103 | B2 | 5/2016 | Oblizajek et al. |
| 2008/0110539 | A1 | 5/2008 | Landers et al. |
| 2009/0025845 | A1 | 1/2009 | Ferlin |
| 2009/0025848 | A1 | 1/2009 | Ferlin |

FOREIGN PATENT DOCUMENTS

| | | |
|---|---|---|
| JP | H11139115 A | 5/1999 |
| JP | 2005262947 A | 9/2005 |

OTHER PUBLICATIONS

Wheeler, R., Dorfi, H., and Keum, B., "Vibration Modes of Radial Tires: Measurement, Prediction, and Categorization Under Different Boundary and Operating Conditions," SAE Technical Paper 2005-01-2523, 2005 (Year: 2005).*
DE Examination Report DE 10 2017 219 519.3 Filed Aug. 17, 2018. 4 pages.
DE Examination Report DE 10 2017 219 520.7 Filed Aug. 8, 2018. 5 pages.

\* cited by examiner

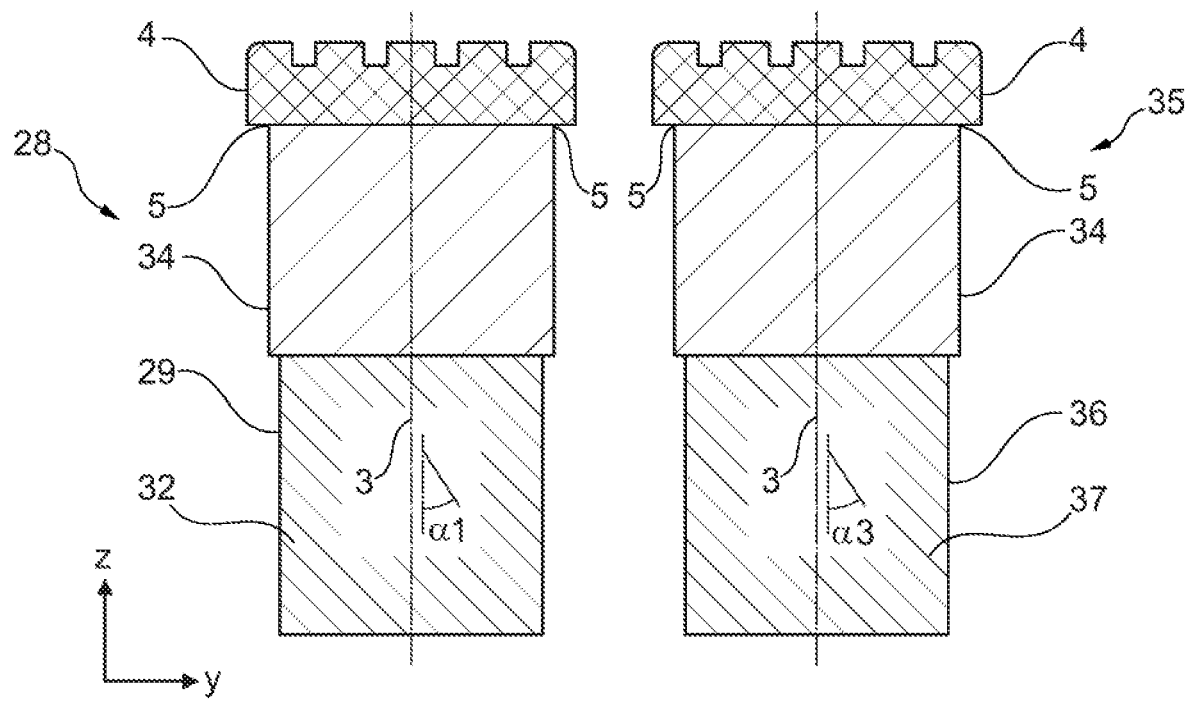
Prior Art
Fig. 6A
Fig. 6B
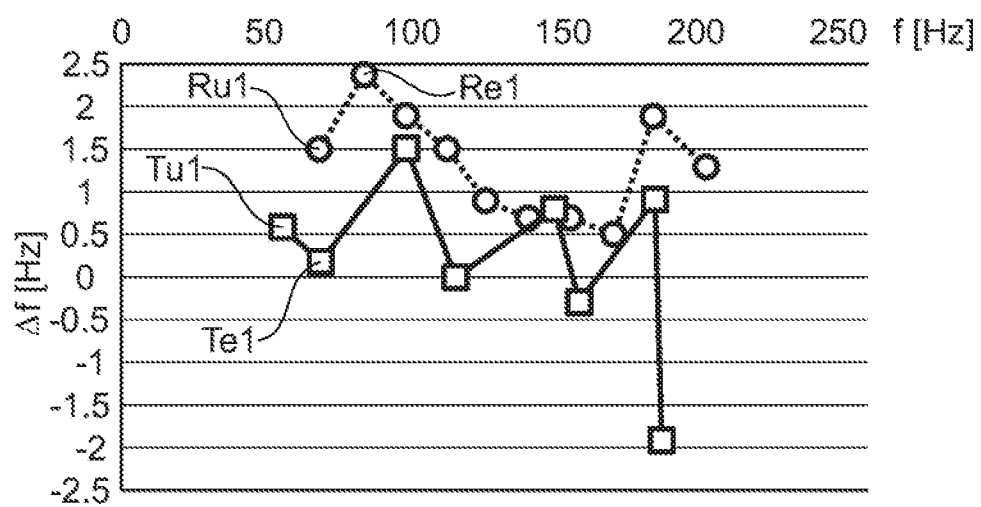
Fig. 6C

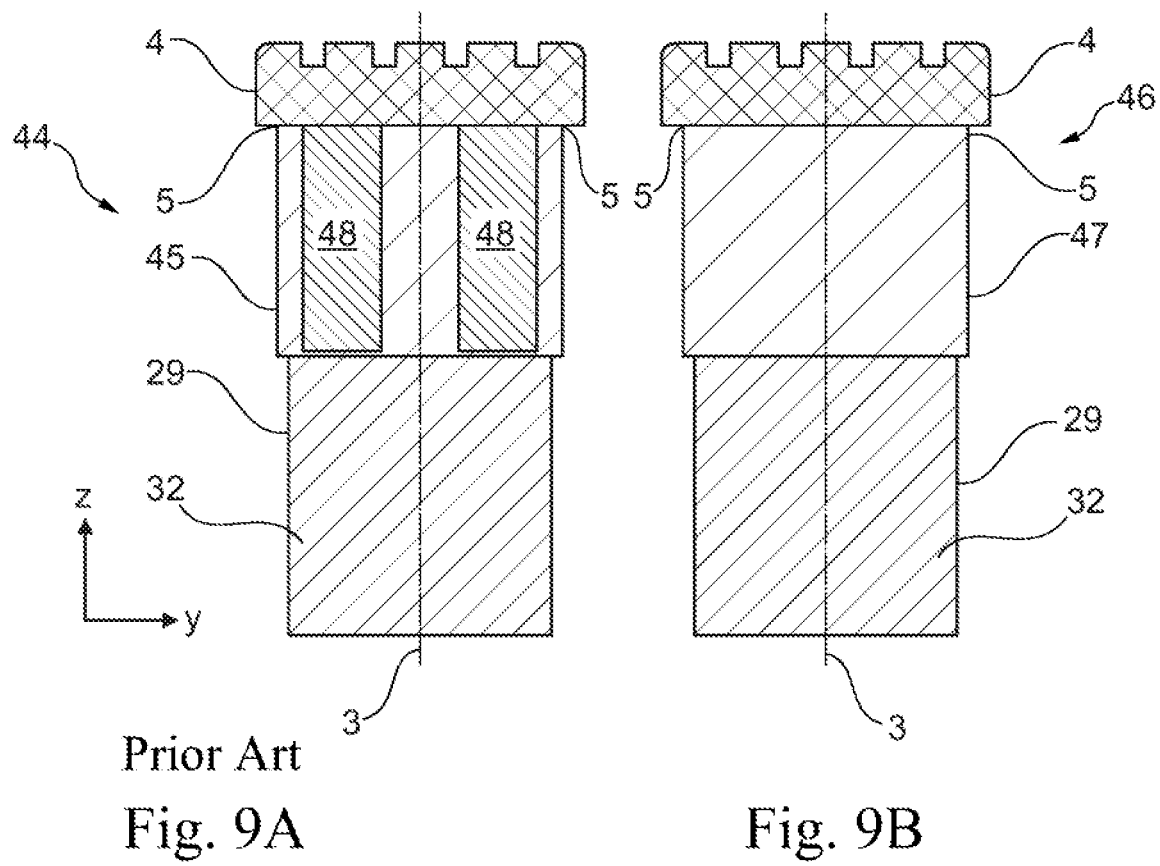
Prior Art
Fig. 9A
Fig. 9B
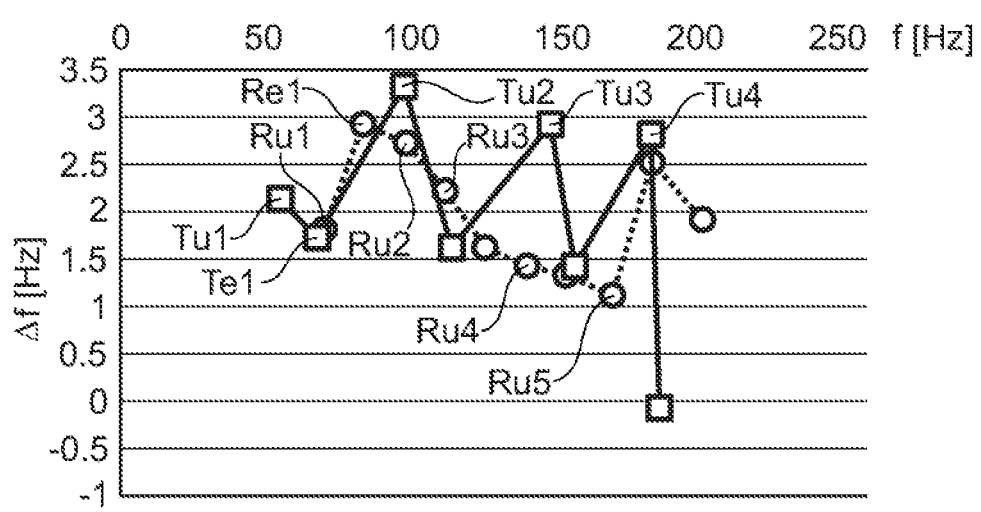
Fig. 9C

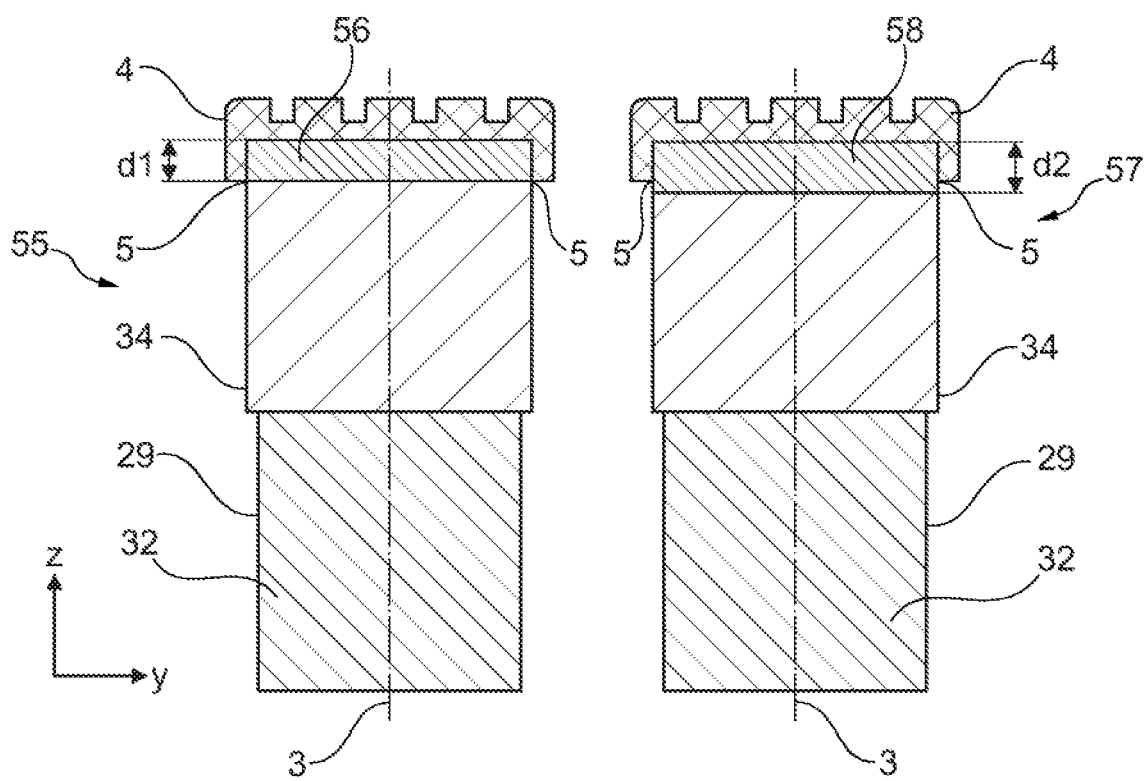
Prior Art
Fig. 14A
Fig. 14B
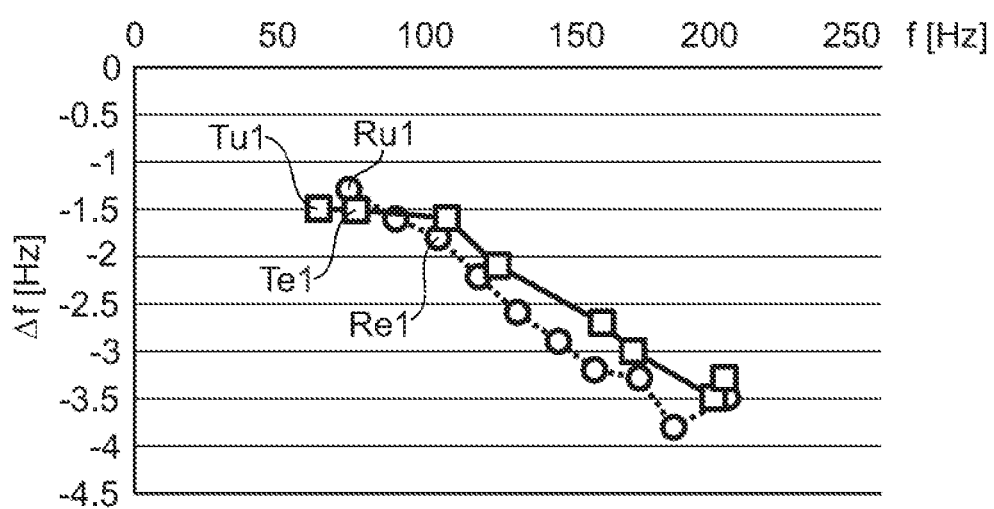
Fig. 14C

METHOD OF IMPROVING PNEUMATIC TIRE VIBRATION CHARACTERISTICS

CROSS-REFERENCE TO RELATED APPLICATIONS

This application claims foreign priority benefits under 35 U.S.C. § 119(a)-(d) to DE Application 10 2017 219 519.3 filed Nov. 2, 2017, which is hereby incorporated by reference in its entirety.

TECHNICAL FIELD

The present invention relates to a pneumatic tire for a vehicle, and to a method for improving tire vibration characteristics to reduce noise, vibration, and harshness (NVH) experienced by vehicle occupants due to tire vibrations.

BACKGROUND

Such pneumatic tires for vehicles are known from a variety of embodiments and very generally have construction elements which include at least one tread band, which encircles a tire circumference and extends in its width torsionally to a tire main plane, and which merges on both sides of the tire main plane into side walls, the ends of which are each formed by a circular/circumferential tire bead. The tread band produces the contact with the roadway surface in operation of the vehicle and substantially transmits drive, braking, and lateral guiding forces via the side walls of the tire to the corresponding tire beads, which in turn have the object of ensuring a stable seat of the tire on a wheel rim coupled to a wheel suspension of the vehicle. The pneumatic tire and the wheel rim form a tire-rim assembly after they are assembled, as described by way of example in US 2009/0025848 A1 (also EP 1 776 248 B1), which in particular discloses an embodiment of a tire bead for a pneumatic tire which is particularly suitable for use on heavy-duty vehicles.

In more recent vehicle development, the wish for a reduction of the driving noises, which occur during the driving operation of a vehicle and are perceptible by users of the vehicle in a vehicle interior, has come more and more strongly into focus as a quality feature and competitive advantage.

In the transmission of driving noises into a vehicle interior, in particular the structure-borne noise transmission between a pneumatic tire excited to vibrations during the driving operation and a wheel rim on which the pneumatic tire is mounted plays an essential role. The structure-borne noise is transmitted from the wheel rim via a wheel suspension to which the rim is attached, to the vehicle body, from which it can be perceived by a vehicle occupant as structure-borne noise (vibrations) and/or as airborne noise emitted into the vehicle interior.

In this case, in particular those vibrations perceptible in a vehicle interior which occur in a frequency range from approximately 60 Hz to approximately 300 Hz are understood to be particularly relevant structure-borne noise. This frequency range can be divided into three sub-ranges, wherein a frequency between approximately 60 Hz and approximately 125 Hz can be perceived as low-frequency noise, a frequency between approximately 125 Hz and approximately 200 Hz can be perceived as high-frequency noise, and a frequency between approximately 200 Hz and approximately 300 Hz can be perceived as so-called cavity noise in the vehicle interior by a vehicle occupant during the operation of the vehicle. The following description essentially always relates to this type of the vehicle noise occurrence and perception and is referred to hereafter for the sake of simplicity as driving noise, wherein this is to be understood as both the structure-borne noise (vibrations) perceptible by a vehicle occupant in the vehicle interior and also the acoustic airborne noise emitted in this way in the vehicle interior.

Furthermore, it is generally known that the pneumatic tires excited to vibrations during the driving operation can form so-called vibration modes of specific vibration frequencies. Vibration modes are understood herein essentially as the stationary properties of standing waves with respect to the energy distribution thereof in various directions. Different vibration modes are characterized in this case, for example, on the basis of the number thereof of vibration modes, which can be both even and also odd. Inter alia, the vibration modes have a substantial influence on the occurrence of the above-mentioned driving noises.

Thus, U.S. Pat. No. 7,073,382 B2 (also DE 600 22 792 T2) describes a method for the construction of a tire and also a tire having reduced cavity sound or cavity noise, wherein various components of the tire, such as a carcass structure, tire beads, side walls, and a reinforced tire vertex provided with reinforcement cords, are arranged so as to achieve a flexibility level of the tire vertex such that it can vibrate in a frequency which corresponds to the mode of the cavity. For this purpose, the circumferential stiffness of the tire is reduced such that a frequency interval between a frequency of the mode of the tire and the frequency of the mode of the cavity is reduced.

A reduction of the stiffness of the tire, in particular in the radial and/or circumferential direction (radial or tangential stiffness, respectively), generally results in worsening of the driving behavior, however, for example, the steering reaction.

Furthermore, a tire having reduced noise development is known from US 2008/0110539 A1, in which profile blocks having randomly distributed circumferential active length are arranged on the tire tread, to avoid a profile-block-induced excitation of the tire to radial and tangential natural vibrations at specific driving velocities.

U.S. Pat. No. 7,213,451 B2 describes a method for the analysis of concentricity deviations of a tire, in particular of odd forces acting on a wheel axle, such as radial and tangential force variations. The obtained analysis results are used in a tire production process to improve the concentricity properties of the tire.

Furthermore, a method and a test arrangement for the analysis of a vibration behavior of a tire as a result of a vibration excitation are known from U.S. Pat. No. 9,329,103 B2 (also DE 10 2013 222 758 A1 and DE 10 2012 201 032 A1), wherein radial vibration modes of the tire can be determined, which can contribute to a specific driving reaction, which is also understood, for example, as structure-borne noise generation. To be able to maintain certain upper limits of the structure-borne noise occurrence, it is very generally proposed that the stiffnesses and damping parameters of the tire be influenced by changing its geometrical shape and by way of the distribution, the amount, and the type of the reinforcing material, for example, rubber, steel, and polyester.

U.S. Pat. No. 6,327,904 B1 (also EP 0 873 886 A2) describes a method for determining the profile depth of a vehicle tire on the driving vehicle, which is based on a sensor-guided determination of a natural frequency of the tire, which corresponds to a torsional vibration component of a tire belt around a rim, on which the tire is mounted.

SUMMARY

Against this background, the present disclosure provides a pneumatic tire for a vehicle, in particular a motor vehicle, in which a structure-borne noise occurrence as a result of the vibration excitation induced during the driving operation of the vehicle is substantially reduced in comparison to pneumatic tires known from the prior art (hereinafter referred to as "a/the prior art pneumatic tire") and as a consequence of which the tire-induced vibrations and/or vehicle noises perceptible by a vehicle occupant in an interior of the vehicle are also substantially reduced. Moreover, the pneumatic tire is to be implementable using structurally simple means and is to overcome the above-mentioned disadvantages of the prior art. The present disclosure is also based on the object of providing a method for producing such a pneumatic tire.

It is to be noted that the features set forth individually in the following description can be combined with one another in any desired technically reasonable manner and display further embodiments of the invention. The description additionally characterizes and specifies the invention in particular in conjunction with the figures.

According to the present disclosure, a pneumatic tire for a vehicle, in particular a motor vehicle, has construction elements which include at least one tread band, which runs along a tire circumference and extends in its width torsionally to a tire main plane, and which merges on both sides of the tire main plane via respective tire shoulders into respective side walls, the ends of which are each formed by a tire bead. The tire main plane is understood herein as corresponding to the generally used definition of the tire plane of symmetry running through the tire center point or tire center of gravity perpendicularly to the tire axis of rotation. The tread band produces the contact to the roadway surface in operation of the vehicle in a generally known manner and essentially transmits drive, braking, and lateral guiding forces via the side walls of the pneumatic tire to the corresponding tire beads, which in turn ensure a stable seat of the pneumatic tire on a wheel rim coupled to a wheel suspension of the vehicle, on which the pneumatic tire is mountable.

Furthermore, at least a part of the construction elements of the pneumatic tire, upon predefined vibration excitation, forms radial vibration modes of determined radial vibration frequencies having deflections parallel to the tire main plane and torsional vibration modes of determined torsional vibration frequencies having deflections torsional to the tire main plane. The different radial vibration modes and the different torsional vibration modes respectively have different even and/or different odd numbers of vibration modes. As already mentioned, vibration modes are understood herein essentially as the stationary properties of standing waves forming on the pneumatic tire as a result of the vibration excitation with respect to the energy distribution thereof in various directions, in particular in the radial and torsional direction here.

It is to be noted that the conjunction "and/or", which stands between two features and links them to one another, always expresses herein that in a first embodiment of the subject matter of the invention solely the first feature can be provided, in a second embodiment solely the second feature can be provided, and in a third embodiment both the first and also the second feature can be provided.

It is furthermore provided that in relation to a prior art pneumatic tire, which also has the construction elements of its type, at least one construction element of the disclosed pneumatic tire is formed and/or arranged such that for the radial vibration modes and the torsional vibration modes having respective vibration frequencies (i.e., radial vibration frequencies or torsional vibration frequencies, respectively) preferably less than 350 Hz, at least one determined frequency interval of ascertainable frequency intervals is enlarged at least between a) the radial vibration mode frequencies and the torsional vibration mode frequencies of/at respectively odd-numbered vibration modes, and/or between b) the radial mode vibration frequencies and the torsional mode vibration frequencies of/at respectively even-numbered vibration modes.

In other words, according to the invention, the frequency intervals at least between the radial vibration frequencies and the torsional vibration frequencies of the corresponding vibration modes (i.e., radial vibration modes or torsional vibration modes, respectively) having respectively odd vibration mode number and/or the frequency intervals between the radial vibration frequencies and the torsional vibration frequencies of the corresponding vibration modes (i.e., radial vibration modes or torsional vibration modes, respectively) having respectively even vibration mode number are considered. Accordingly, for example, a consideration takes place of a) the frequency interval between a radial vibration frequency of a first (second, third, etc.) radial vibration mode at/for odd-numbered vibration mode, and a torsional vibration frequency of a first (second, third, etc.) torsional vibration mode also at/of odd-numbered vibration modes, or a consideration takes place of b) the frequency interval between a radial vibration frequency of a first (second, third, etc.) radial vibration mode of/at even-numbered vibration modes and a torsional vibration frequency of a first (second, third, etc.) torsional vibration mode also at/of even-numbered vibration modes, or the consideration takes place of both the first-mentioned frequency intervals and also the second-mentioned frequency intervals.

According to the preceding definition, it is also conceivable to additionally also incorporate the frequency intervals between the radial vibration frequencies and the torsional vibration frequencies of the corresponding vibration modes (i.e., radial vibration modes or torsional vibration modes, respectively) having odd vibration mode number and even vibration mode number into the consideration, i.e., for example, a consideration of the frequency interval between a radial vibration frequency of a first (second, third, etc.) radial vibration mode having odd vibration mode number and a torsional vibration frequency of a first (second, third, etc.) torsional vibration mode having even vibration mode number, or a consideration of the frequency interval between a radial vibration frequency of a first (second, third, etc.) radial vibration mode having even vibration mode number and a torsional vibration frequency of a first (second, third, etc.) torsional vibration mode having odd vibration mode number. However, this is not absolutely necessary for the present invention, since a substantial improvement of the vibration behavior of the pneumatic tire according to the invention as explained in greater detail hereafter may already be achieved upon the consideration of the frequency intervals between the radial and torsional vibration frequencies of the corresponding radial or torsional vibration modes, respectively, having respectively odd vibration mode number and/or the frequency intervals between the radial and torsional vibration frequencies of the corresponding radial or torsional vibration modes, respectively, having respectively even vibration mode number.

The statement used in the preceding definition according to the invention, that the prior art pneumatic tire has the construction elements, for example, the tread band, the tire shoulders, the side walls, and the tire beads, is always to be understood herein such that these construction elements are merely provided in a similar type in the prior art pneumatic tires, but do not necessarily have to have the same properties or the same arrangement (configuration, construction, etc.) as the construction elements of the pneumatic tire according to the invention. This applies in particular to at least one component which is formed differently and/or arranged differently in any case according to the definition according to the invention than the corresponding construction element of the comparison pneumatic tire. The remaining tire components can be designed identically (both in the properties and also in the arrangement thereof) both in the comparison pneumatic tire and also in the pneumatic tire according to the invention. Furthermore, it is to be understood that the comparison pneumatic tire and the pneumatic tire according to the invention can also each have further construction elements, with which no correspondence is associated in the respective other pneumatic tire.

The properties of a tire component are understood herein in particular as its material properties such as elasticity, stiffness, its mass (weight), its shape or geometry, respectively, and the like. The "arrangement" of a construction element always relates to its relative location with respect to the other provided construction elements of the pneumatic tire.

Corresponding to the general definition, the elasticity of a construction element is also understood herein as its property or the property of its material, respectively of changing its shape under force action and returning into the original shape upon cessation of the acting force. The stiffness of a construction element, in contrast, describes its resistance to elastic deformation as a result of a force or a torque (bending torque or torsion torque, depending on the strain) acting thereon. Accordingly, there are various types of stiffnesses, such as elongation, bending, and torsional stiffness.

In the meaning of the present invention, relative terms used herein with respect to a feature, for example, the relative term "larger" already used above, but also further relative terms used herein such as "smaller", "wider", "narrower", "higher", "lower", "heavier", "lighter", "softer", "harder", and the like are always to be interpreted such that production-related dimension deviations of the relevant feature which are within the production tolerances defined for the respective production method of the relevant feature are not included by the respective relative term. In other words, according to this definition, which is applicable in the entire document present here, in the meaning of the present invention, a dimension of a feature is only to be considered "larger", "smaller", "wider", "narrower", "higher", "lower", "heavier", "lighter", "softer", "harder", and the like than a dimension of a comparison feature if the two compared dimensions differ from one another sufficiently in the value thereof that this dimension difference is reliably no longer to be attributed to the production-related tolerance deviations of the relevant feature, but rather is the result of an intentional action.

The inventors have recognized that the vibration behavior of the pneumatic tire may be achieved to a substantial extent with respect to a reduced structure-borne noise occurrence as a result of the vibration excitation induced during the driving operation of the vehicle on the pneumatic tire and thus a substantial reduction of the tire-induced vibrations and/or driving noises perceptible by a vehicle occupant in an interior of the vehicle by constructing the tire such that: at least one frequency interval (or multiple or even all frequency intervals, respectively,) between the radial vibration frequencies and the torsional vibration frequencies of the respective vibration modes is/are enlarged in the above-described cases. As the inventors have further found, this applies in particular in a very decisive manner to those frequency intervals which are relatively small in the comparison pneumatic tire, for example, are in the range of a few hertz, for example, within a frequency range between approximately 0 Hz to less than 10 Hz or between approximately 0 Hz and less than 5 Hz. This circumstance is attributed to the fact that the radial vibration modes and the torsional vibration modes having respectively odd-numbered vibration modes and/or the radial vibration modes and the torsional vibration modes having respectively even-numbered vibration modes particularly amplify one another by mutual energy transfer if the corresponding radial vibration frequencies and torsional vibration frequencies only have a small interval from one another.

According to the invention, the vibration behavior may thus be substantially improved in the meaning according to the invention solely by a different arrangement and/or a different embodiment, for example, of the material properties and/or the shape and/or geometry, of at least one construction element of the pneumatic tire according to the invention of the construction elements provided in any case on this pneumatic tire, in other words thus merely by a modification of the tire architecture. Additional sound-damping and/or vibration-damping devices on the pneumatic tire are therefore advantageously not required to achieve the same effect.

According to one advantageous embodiment of the invention, the at least one determined frequency interval is less than 5 Hz in the comparison pneumatic tire and is enlarged to 5 Hz or more in the pneumatic tire according to the invention after adaptation of the at least one construction element. The mutual influence of the respective radial and torsional vibration modes may already be reduced or suppressed to such a substantial extent in this way that the above-described and desired advantageous vibration properties of the pneumatic tire are achieved.

A further advantageous embodiment of the invention provides that the construction elements furthermore include a carcass structure anchored on each side of the tire main plane on the respective tire bead and having at least one carcass ply, and a belt structure having at least one belt ply, which is incorporated between the tread band and the carcass structure so as to coaxially enclose the latter. The at least one belt ply has belt cords, the running direction of which includes a predeterminable running angle in relation to the tire main plane. In this case, for example, an acute angle (i.e., less than 90°) enclosed between the belt cords and the tire main plane can be defined as the running angle to be considered here. In the pneumatic tire according to the invention according to this embodiment, this running angle is selected as less than or greater than a comparison running angle of comparison belt cords of a comparison belt ply of a comparison belt structure of the comparison pneumatic tire.

A reduction of the running angle in relation to the comparison pneumatic tire permits a particularly favorable influence of the radial vibration frequencies of the corresponding radial vibration modes with respect to an enlargement of the frequency interval between the radial vibration frequencies and the torsional vibration frequencies. An increase of this running angle enables a favorable influence (in the meaning of the disclosure) in particular of the torsional vibration mode frequencies in relation to the radial vibration mode frequencies.

Still a further advantageous embodiment of the invention provides that the construction elements furthermore include a bead core, which forms the tire bead and has a plurality of steel cords, and also a bead wedge, which has a predeterminable bead wedge width and a predeterminable bead wedge height, and which encloses the bead core in a rotationally-symmetrical manner along its outer circumference. A particularly favorable influence in the meaning of the invention of the vibration behavior of the pneumatic tire is shown if either the bead wedge width is selected as less and the bead wedge height is selected as greater or the bead wedge width and the bead wedge height are selected as greater than a comparison bead wedge width and a comparison bead wedge height of a comparison tire bead of the comparison pneumatic tire. The width of the bead wedge, which is also referred to as a bead filler, core profile, or apex, corresponds to its widest (greatest) extent or extension in the axial direction of the pneumatic tire, i.e., essentially perpendicular to the tire main plane, while in contrast the height of the bead wedge corresponds to its tallest (greatest) extent or extension essentially parallel to the tire main plane, i.e., in the radial direction of the pneumatic tire.

Still a further advantageous embodiment of the invention provides that the construction elements furthermore include a carcass structure anchored on each side of the tire main plane on the respective tire bead and having at least one carcass ply, a belt structure having at least one belt ply, which is incorporated between the tread band and the carcass structure so as to coaxially enclose the latter, and a belt cover ply structure having at least one belt cover ply, which is incorporated between the tread band and the belt structure so as to coaxially enclose the latter, wherein the belt cover ply extends in its width torsionally to the tire main plane essentially between the tire shoulders. A particularly favorable influence in the meaning of the invention of the vibration behavior of the pneumatic tire is also shown if the belt cover ply structure has a constant thickness over its entire width in comparison to a comparison belt cover ply structure of the comparison pneumatic tire, which has a greater thickness in the region of the tire shoulders than in the region of its middle section adjoining the tire main plane. The thickness of the belt cover ply or the belt cover ply structure corresponds in this case to its extent or extension in the radial direction of the pneumatic tire.

It is to be noted at this point that the carcass structure mentioned here and/or the belt structure mentioned here of the pneumatic tire according to this embodiment can be identical to the above-mentioned carcass structure and/or belt structure of the other embodiment also already described there of the pneumatic tire according to the invention having modified running angle of the belt cords.

Tire constructions having varying thickness of the belt cover ply structure over its width extending essentially between the tire shoulders are implemented in a generally known manner, for example, by the belt cover ply structure having one more belt cover ply in the region of the tire shoulders than in its middle region adjoining the tire main plane. If the belt cover ply structure has a single belt cover ply in its middle region, for example, it accordingly has at least two belt cover plies in its edge region adjoining the tire shoulders. In this case, reference is generally also made to a 2-1-2 construction of the belt cover ply structure. In general, the comparison pneumatic tire having varying thickness of the belt cover ply structure can accordingly have at least one more belt cover ply in the region of the tire shoulders than in its middle section.

According to a further advantageous embodiment of the invention, the construction elements furthermore include a carcass structure anchored on each side of the tire main plane on the respective tire bead and having at least one carcass ply, and a belt structure having at least one belt ply, which is incorporated between the tread band and the carcass structure so as to coaxially enclose the latter. The belt ply has a predeterminable belt width extending torsionally to the tire main plane. A particularly favorable influence in the meaning of the invention of the vibration behavior of the pneumatic tire is also shown if the belt width is selected as less than a comparison belt width of a comparison belt ply of a comparison belt structure of the comparison pneumatic tire.

It is to be noted again at this point that the carcass structure mentioned here and/or the belt structure mentioned here of the pneumatic tire according to the invention according to this embodiment can be identical to the above-mentioned carcass structure(s) and/or belt structure(s) of the other embodiment(s) also described there of the pneumatic tire according to the invention having modified running angle of the belt cords and/or having constant thickness of the belt cover ply.

According to still further advantageous embodiments of the invention, at least one side wall has a lesser stiffness than a comparison side wall of the comparison pneumatic tire and/or the tread band has a lesser stiffness than a comparison tread band of the comparison pneumatic tire. The vibration behavior of the pneumatic tire may also be influenced particularly favorably in the meaning of the invention by these two embodiments either alone or in combination.

It is to be noted again at this point that the above-described different embodiments of the pneumatic tire according to the invention can also be combined with one another as desired to induce a favorable influence of the vibration behavior of the pneumatic tire as described herein in the meaning of the invention. Since an enlargement of the frequency interval between the respective radial vibration frequencies and the torsional vibration frequencies may solely be achieved in a determined frequency range section of the frequency range proposed according to the invention of less than 350 Hz and preferably less than 300 Hz using some of the above-described embodiments, enlargements of the frequency intervals in multiple frequency range sections, for example, in adjoining frequency range sections, can be achieved as required by different combinations of the above-described various embodiments, in order to provide an advantageous vibration behavior of the pneumatic tire in the meaning of the present invention in a larger frequency range in this way than would be possible, for example, by way of the adaptation of only a single construction element of the pneumatic tire according to the invention according to one of the above-described embodiments.

According to a further aspect of the present invention, a method is provided for producing a pneumatic tire for a vehicle, in particular a motor vehicle. The pneumatic tire has construction elements which include at least one tread band, which runs along a tire circumference and extends in its width torsionally to a tire main plane, and merges on both sides of the tire main plane via respective tire shoulders into respective side walls, the ends of which are each formed by a tire bead. In the method according to the invention, a comparison pneumatic tire, which also has the construction elements of its type, is excited using a predeterminable vibration excitation to vibrations which result, in at least a part of the construction elements, in the formation of radial vibration modes of determined radial vibration frequencies having deflections parallel to the tire main plane and the formation of torsional vibration modes of determined torsional vibration frequencies having deflections torsional to the tire main plane. The different radial vibration modes and the different torsional vibration modes each have different even and/or different odd numbers of vibration modes. Furthermore, the radial vibration frequencies of the different radial vibration modes and the torsional vibration frequencies of the different torsional vibration modes are measured. Subsequently, for the radial vibration modes and the torsional vibration modes having respective vibration frequencies (i.e., radial vibration frequencies or torsional vibration frequencies, respectively) less than 350 Hz, the frequency intervals between the vibration frequencies of the radial vibration modes and the vibration frequencies of the torsional vibration modes having respectively odd vibration mode number and/or between the radial vibration frequencies of the radial vibration modes and the torsional vibration frequencies of the torsional vibration modes having respectively even vibration mode number are ascertained. Subsequently, as a function of at least one frequency interval determined from the ascertained frequency intervals, at least one construction element is formed modified and/or arranged modified such that the determined frequency interval is increased in the pneumatic tire to be produced.

Reference is made to the preceding explanations of corresponding definitions, effects, and advantages with respect to the pneumatic tire according to the invention with respect to method-related term definitions and the effects and advantages of features of the method. Disclosures herein with respect to the pneumatic tire according to the invention should also be able to be used correspondingly for the definition of the production method according to the invention, if this is not expressly precluded herein. Disclosures herein with respect to the production method according to the invention should also be able to be used correspondingly for the definition of the pneumatic tire according to the invention, if this is not also expressly precluded herein. A repetition of such correspondingly equivalent explanations is thus omitted herein in favor of a more compact description.

The vibration excitation to study the vibration behavior of the comparison pneumatic tire can be carried out by means of a testing device known per se, wherein a force excitation of the pneumatic tire in preferably only one spatial direction, preferably only in the radial direction of the pneumatic tire, is preferably executed via a vibration plate, against which the tread band of the comparison pneumatic tire to be studied presses. The radial vibration frequencies of the radial vibration modes occurring in this case and the torsional vibration frequencies of the torsional vibration modes also occurring in this case and also the number of the vibration modes of the respective radial and torsional vibration modes can be determined in a conventional manner via corresponding measurement sensors.

After the ascertainment of the frequency intervals, as described above, the frequency interval(s) which has/have a particularly low value, in particular less than 10 Hz, preferably less than 5 Hz, is/are particularly preferably used to establish a modification (for example, material property and/or arrangement) of at least one construction element of the pneumatic tire according to the invention, since a particularly strong mutual energy influence is to be expected in these radial and torsional vibration modes.

According to one advantageous embodiment of the invention, the at least one determined frequency interval is less than 5 Hz in the comparison pneumatic tire and is enlarged to 5 Hz or more by the modification of the at least one construction element.

Further features and advantages of the invention result from the following description of exemplary embodiments of the invention, which are not to be understood as restrictive and which are explained in greater detail hereafter with reference to the drawing. In the schematic figures of this drawing:

BRIEF DESCRIPTION OF THE DRAWINGS

FIG. 6A shows the comparison pneumatic tire from FIG. 5A having the construction element to be modified, FIG. 6B shows an exemplary embodiment of a pneumatic tire according to the invention having a construction element modified in relation to the comparison pneumatic tire from FIG. 6A, FIG. 6C shows two graphs to illustrate the frequency shift of radial vibration frequencies and torsional vibration frequencies as a result of the modified construction element illustrated in FIG. 6B, FIG. 9A shows a comparison pneumatic tire having a further construction element to be modified, FIG. 9B shows an exemplary embodiment of a pneumatic tire according to the invention having a construction element modified in relation to the comparison pneumatic tire from FIG. 9A, FIG. 9C shows two graphs to illustrate the frequency shift of radial vibration frequencies and torsional vibration frequencies as a result of the modified construction element illustrated in FIG. 9B, FIG. 14A shows a comparison pneumatic tire having a further construction element to be modified, FIG. 14B shows an exemplary embodiment of a pneumatic tire according to the invention having a construction element modified in relation to the comparison pneumatic tire from FIG. 14A, and FIG. 14C shows two graphs to illustrate the frequency shift of radial vibration frequencies and torsional vibration frequencies as a result of the modified construction element illustrated in FIG. 14B.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Parts equivalent with respect to the function thereof are always provided with the same reference signs in the different figures, and therefore they are generally also only described once.

Figure 1:
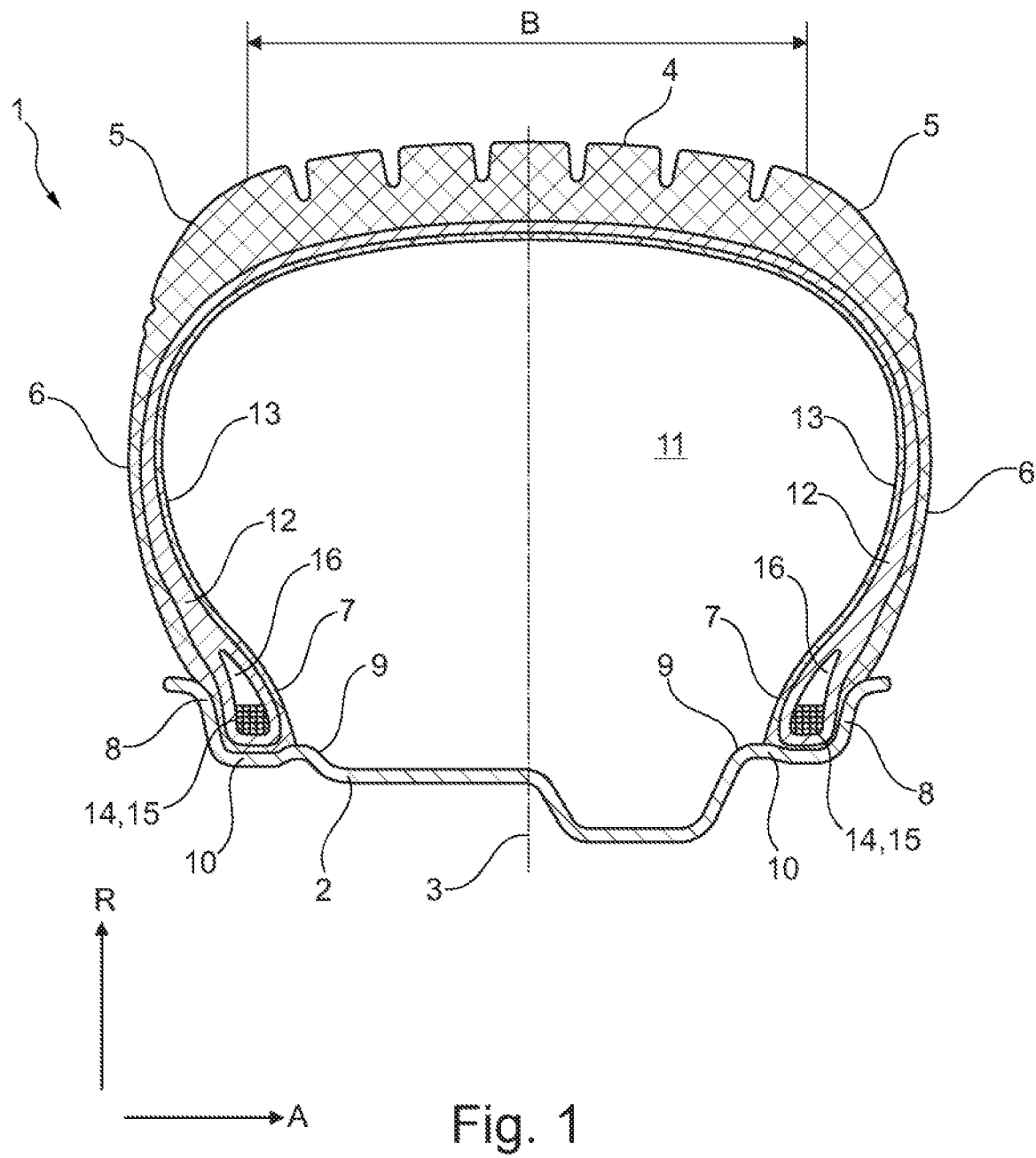
FIG. 1 shows a cross-sectional view of an exemplary embodiment of a pneumatic tire according to the invention.

FIG. 1 schematically shows a partial cross-sectional view of an exemplary embodiment of a pneumatic tire 1 to explain a general structure of the pneumatic tire 1. The plane of section of the illustration runs in this case in parallel to an axial axis or axis of rotation (not visible in FIG. 1) of the pneumatic tire 1, wherein only the upper half of the cross-sectional pneumatic tire 1 is visible in FIG. 1. The running direction of the axial axis of the pneumatic tire 1 is indicated in FIG. 1 by an arrow identified with A, and a radial direction of the pneumatic tire 1 with the designation R.

As can be seen in FIG. 1, the pneumatic tire 1 is illustrated mounted on a wheel rim 2. The tire-rim assembly 1, 2 formed in this manner forms a vehicle wheel for a motor vehicle (not shown in greater detail) in a manner known per se, for example, a passenger automobile. However, the pneumatic tire 1 according to the invention is generally not restricted to the use on passenger automobiles. Other single-track or multitrack vehicle types, for example, motorcycles, trucks, and the like, are also conceivable. The wheel rim 2 shown in FIG. 1 is not significant for the present invention (since no alteration or modification of the wheel rim is contemplated), it is only shown here for the description of the complete tire-rim assembly 1, 2.

As can be inferred from FIG. 1, the pneumatic tire 1 comprises various components. In particular, these construction elements in the pneumatic tire 1 illustrated in FIG. 1 include at least one tread band 4, which runs around a tire circumference and extends in its width B tangentially to a tire main plane 3. The tire main plane 3 is the tire plane of symmetry running through the tire center point or tire center of gravity (not visible, below the portion of tire shown) perpendicularly to the tire axis of rotation (also not visible).

In the pneumatic tire 1 illustrated in FIG. 1, the tread band 4 is profiled or structured on its radial outer side. However, this is not absolutely necessary for the present invention. As furthermore can be seen in FIG. 1, the tread band 4 merges on both sides of the tire main plane 3 via respective tire shoulders 5 into respective side walls 6. The respective radially-inner ends of the side walls 6 are each formed by a tire bead 7, which is inserted in an airtight manner in each case into a bead seat 10 of the wheel rim 2 delimited in the axial direction A by a rim horn 8 and a hump 9, and therefore after the mounting of the pneumatic tire 1 on the wheel rim 2, an air cavity 11 filled with compressed air is formed between the pneumatic tire 1 and the wheel rim 2.

It can furthermore be inferred from FIG. 1 that the construction elements of the pneumatic tire 1 furthermore include a carcass structure anchored on each side of the tire main plane 3 on the respective tire bead 7 and having at least one carcass ply 12. An inner lining 13 (also referred to as inner liner) is applied to the side of the carcass ply 12 facing toward the air cavity 11, which inner liner is conventionally formed as a rubber ply for sealing the pneumatic tire 1 and/or the air cavity 11.

Furthermore, it can be seen in FIG. 1 that the construction elements of the pneumatic tire 1 furthermore include a bead core 15, which forms the tire bead 7 and has a plurality of steel cords 14, and a bead wedge 16 (also referred to as a bead filler, core profile, or apex), which encloses the bead core 15 in a rotationally-symmetrical manner along its outer circumference.

Figure 2:
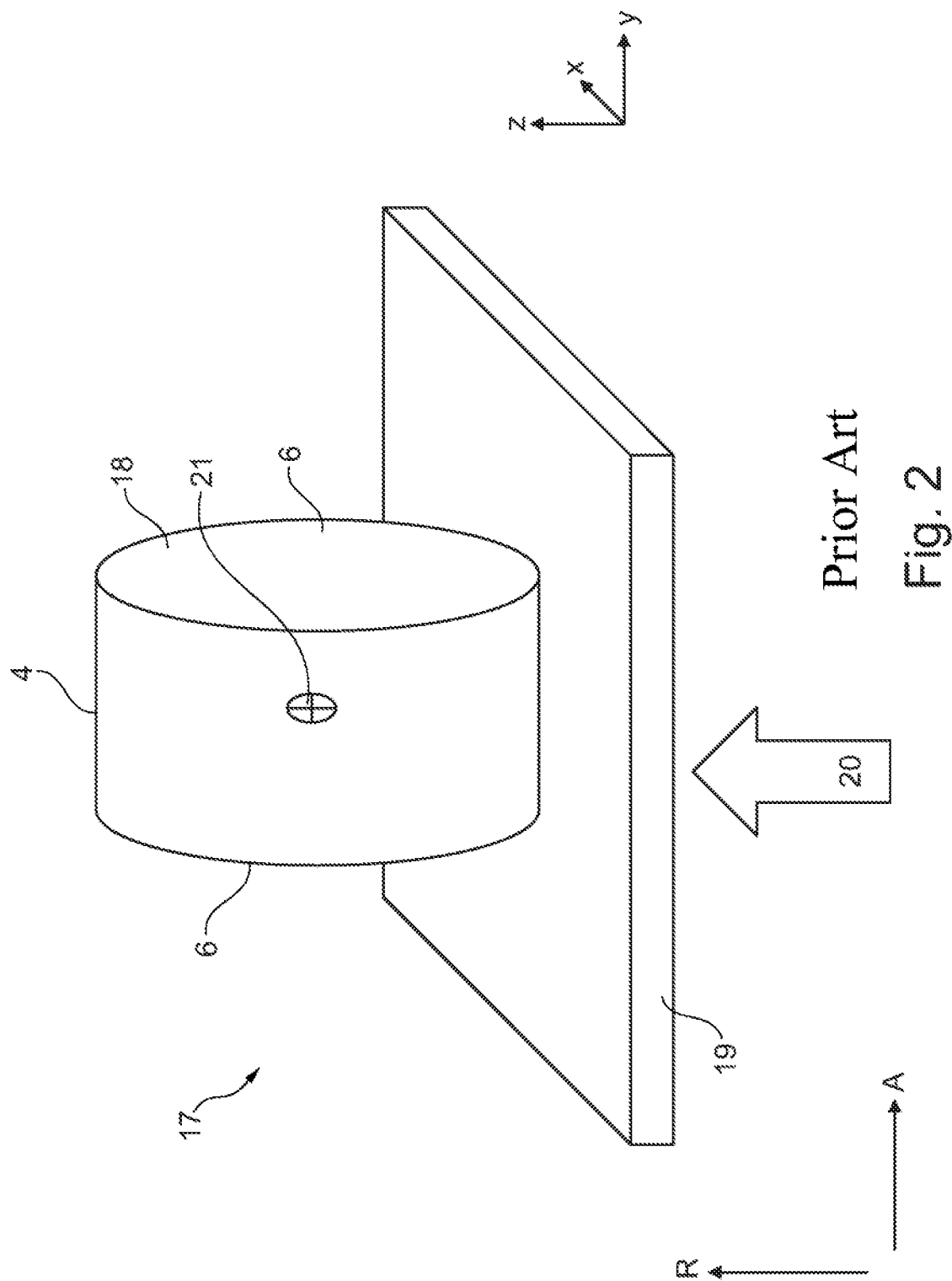
FIG. 2 shows a perspective view of a test device for vibration excitation of a pneumatic tire for carrying out an exemplary embodiment of a method according to the invention.
Figure 3A:
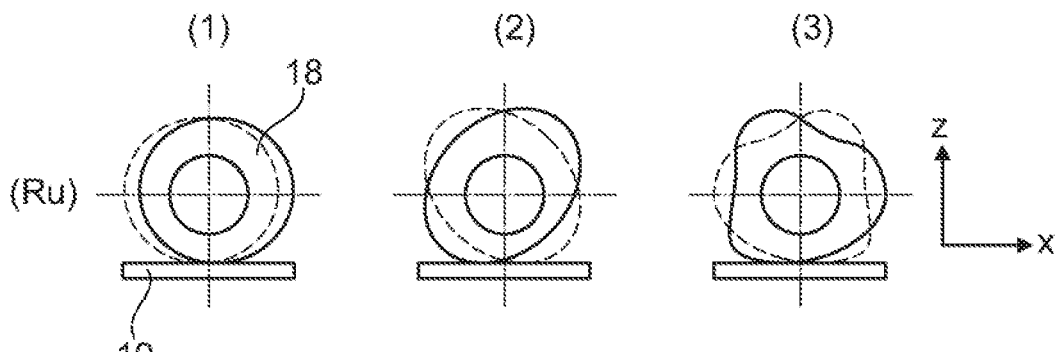
FIG. 3A shows the first three possible radial vibration modes having odd number of vibration modes.
Figure 3B:
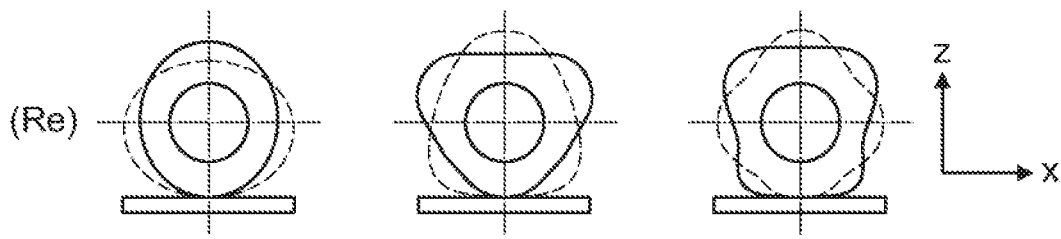
FIG. 3B shows the first three possible radial vibration modes having even number of vibration modes.
Figure 3C:
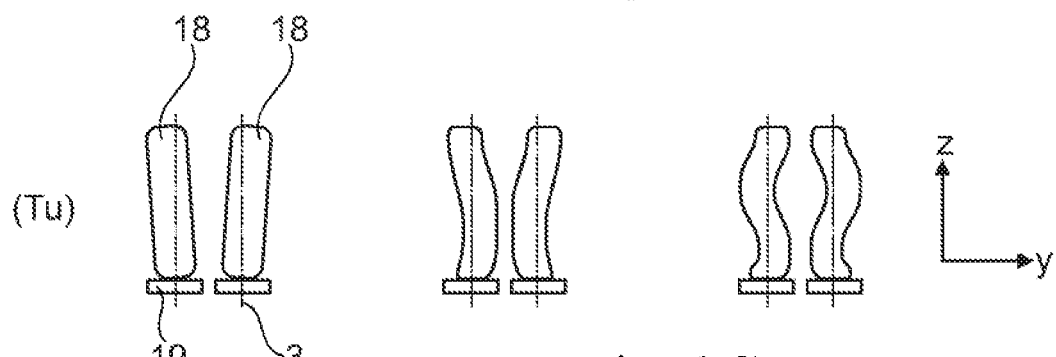
FIG. 3C shows the first three possible torsional vibration modes having odd number of vibration modes.
Figure 3D:
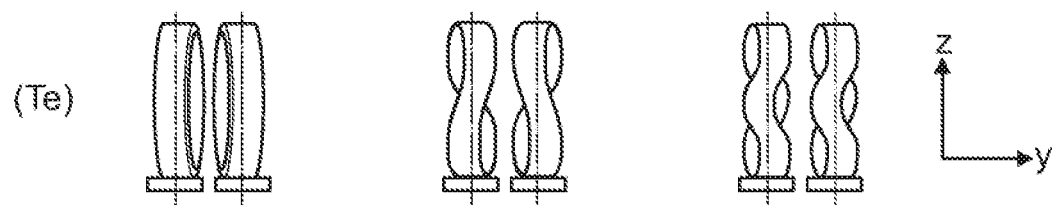
FIG. 3D shows the first three possible torsional vibration modes having even number of vibration modes.

FIG. 2 schematically shows a perspective view of a test device 17 for vibration excitation of a pneumatic tire 18 to carry out an exemplary embodiment of a method according to the invention. It is to be understood that the pneumatic tire 18 shown in FIG. 2 can be both a pneumatic tire according to the invention embodied according to the present invention, for example, the pneumatic tire 1 shown in FIG. 1, and also a comparison pneumatic tire according to the prior art, which can, but does not have to, have all other construction elements of the pneumatic tire according to the invention except for at least one construction element.

As can be inferred from FIG. 2, the test device 17 has a vibration plate 19, against which the tread band 4 of the pneumatic tire 18 presses. The pneumatic tire 18 is excited to vibrations by means of the vibration plate 19. In the method according to the invention, a vibration excitation of the pneumatic tire 18 or at least a part of its construction elements, for example, the tread band 4 and/or the side walls 6, takes place in particular by the vibration plate 19 executing a force excitation 20 of the pneumatic tire 18 in preferably only one spatial direction x, y, z. In the test device 17 shown in FIG. 2, the vibration or force excitation 20 takes place using white noise known per se, in order to cover a vibration excitation in a frequency band from preferably 25 Hz to 350 Hz, only in the z spatial direction shown in FIG. 2, i.e., in the radial direction R of the pneumatic tire 18. The force response induced by this vibration excitation, for example, at a measurement point 21 remote from the vibration plate 19 on the tread band 4, can be determined in a conventional manner via corresponding measurement sensors (not shown here). A force response in the x or z direction is defined herein as a radial force response in relation to the pneumatic tire 18, a force response in the y direction as a torsional force response.

The vibration excitation of the pneumatic tire 18 or at least a part of its construction elements, for example, the tread band 4 and/or the side walls 6, results, in at least this part of the construction elements, in the formation of radial vibration modes Rui, Rei (where i=1, 2, 3, . . . ; u="odd"; e="even") of determined radial vibration frequencies $f_{Rui}$ or $f_{Rei}$, respectively, with deflections parallel to the tire main plane 3 (see FIG. 1) and in the formation of torsional vibration modes Tuj, Tej (where j=1, 2, 3, . . . ; u="odd"; e="even") of determined torsional vibration frequencies $f_{Tuj}$, $f_{Tej}$ with deflections torsional to the tire main plane 3, wherein the different radial vibration modes and the different torsional vibration modes each have different even and/or different odd numbers of vibration modes.

The respective first three possible radial vibration modes Ru1, Ru2, Ru3, Re1, Re2, Re3 and torsional vibration modes Tu1, Tu2, Tu3, Te1, Te2, Te3 both with odd and also with even number of vibration modes are schematically shown in FIG. 3. In this case, view a) in FIG. 3 shows the first three possible radial vibration modes Ru1 (column (1) in FIG. 3), Ru2 (column (2) in FIG. 3), Ru3 (column (3) in FIG. 3) with odd number of vibration modes, view (b) shows the first three possible radial vibration modes Re1, Re2, Re3 with even number of vibration modes, view (c) shows the first three possible torsional vibration modes Tu1, Tu2, Tu3 with odd number of vibration modes, and view (d) shows the first three possible torsional vibration modes Te1, Te2, Te3 with even number of vibration modes.

In the views (a) and (b) of FIG. 3, the tire main plane 3 corresponds to the plane of the drawing. It can therefore be recognized that the radial vibration modes Rui, Rei form deflections parallel to the tire main plane 3 (radial or z or x spatial direction) and the torsional vibration modes Tuj, Tej form deflections torsional to the tire main plane 3 (torsional or y spatial direction). The reference signs of the individual views in FIG. 3 are only explicitly indicated for the sake of comprehensibility in the illustrations of the radial vibration mode Ru1 and the torsional vibration mode Tu1, since the reference signs of the remaining illustrations result uniquely directly therefrom. Each illustration of the radial vibration modes Ru1 . . . 3 and Re1 . . . 3 and the torsional vibration modes Tu1 . . . 3 and Te1 . . . 3 shows respectively two extreme vibration positions of the corresponding standing waves forming on the pneumatic tire 18 as a result of its vibration excitation.

Following Table 1 indicates the number of vibration modes for all respective radial or torsional vibration modes shown in FIG. 3:

TABLE 1

|  | i, j = 1 | i, j = 2 | i, j = 3 |
| --- | --- | --- | --- |
| Rui | 1 | 3 | 5 |
| Rei | 2 | 4 | 6 |
| Tuj | 1 | 3 | 5 |
| Tej | 2 | 4 | 6 |

Using the test device 17 schematically illustrated in FIG. 2, in general the radial vibration frequencies $f_{Rui}$ and $f_{Rei}$ and also $f_{Tuj}$, $f_{Tej}$ respectively associated with the radial vibration modes Rui and Rei and the torsional vibration modes Tuj and Tej may be determined. The number of the studied radial vibration modes and torsional vibration modes is not merely restricted to three in each case (i=1 . . . 3; j=1 . . . 3), of course. Depending on the measuring resolution achievable using the test device 17, more than three vibration modes Rui, Rei, Tuj, Tej and the associated radial and/or torsional vibration frequencies $f_{Rui}$, $f_{Rei}$, $f_{Tuj}$, $f_{Tej}$ thereof may also be ascertained, respectively.

Figures 4A, 4B:
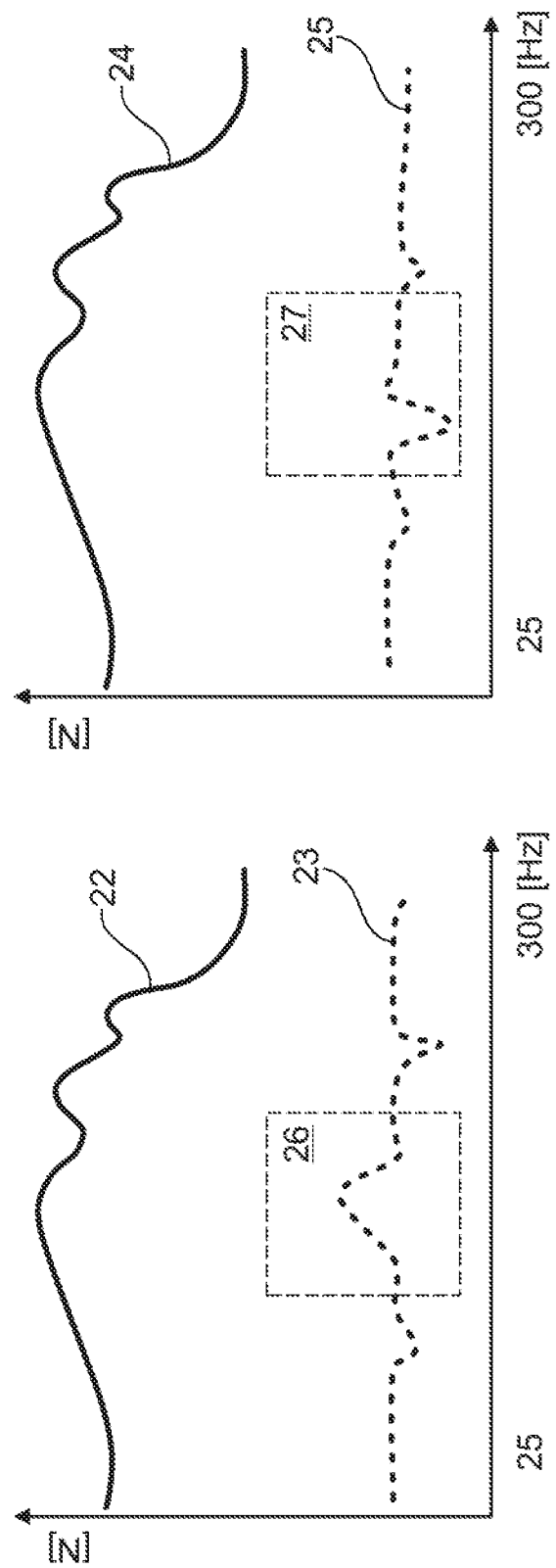
FIG. 4A shows, a graph illustrating respective plots of a radial and a torsional force response as a result of the vibration excitation shown in FIG. 2 of a comparison pneumatic tire according to the prior art.
FIG. 4B shows a graph illustrating a radial and a torsional force response as a result of the vibration excitation shown in FIG. 2 of respective plots of an exemplary embodiment of a pneumatic tire according to the invention.

The force responses recorded for two different pneumatic tires 18 (FIG. 2) in the z (radial) and y directions (torsional) are illustrated in the two views (a) and (b) of FIG. 4. In this case, view (a) shows the radial force response 22 (z spatial direction) and the torsional force response 23 (y spatial direction) of a comparison pneumatic tire according to the prior art measured using the test device 17 illustrated in FIG. 2 and view (b) shows the radial force response 24 (z spatial direction) and the torsional force response 25 (y spatial direction) of an exemplary embodiment of a pneumatic tire according to the invention measured using the test device 17 illustrated in FIG. 2, in which at least one construction element is formed modified and/or is arranged modified relative to other construction elements in relation to the comparison pneumatic tire, which can otherwise have the same construction elements as the pneumatic tire according to the invention.

In FIG. 4, the abscissa in both views (a) and (b) represents a vibration frequency in Hz, and the ordinate represents a force in N.

As can be seen in particular in the framed frequency range 26 of the view (a), the torsional force response 23 of the measured comparison pneumatic tire has a significant increase, while in contrast no such elevation of the torsional force response 25 can be seen in the same frequency range 27 of the force response 25 of the exemplary embodiment of the pneumatic tire according to the invention, but rather even a significant reduction of the torsional force response 25 can be established in this region 27.

The difference between the comparison pneumatic tire measured using the test device 17 from FIG. 2 and the pneumatic tire according to the invention measured using the same test device 17, as already mentioned, is that at least one construction element in the pneumatic tire according to the invention is formed modified and/or is arranged modified relative to other construction elements in relation to the construction element of the same type of the comparison pneumatic tire. In this way, in the pneumatic tire according to the invention, for the radial vibration modes Rui, Rei and for the torsional vibration modes Tuj, Tej with respective vibration frequencies $f_{Rui}$, $f_{Rei}$, $f_{Tuj}$, $f_{Tej}$ less than 350 Hz, at least one determined frequency interval $\Delta$fuab and/or $\Delta$feab (where a: determined i; b: determined j; u: "odd"; e: "even") from ascertainable frequency intervals $\Delta$fuij, $\Delta$feij at least between the radial vibration frequencies $f_{Rui}$ of the radial vibration modes Rui and the torsional vibration frequencies $f_{Tuj}$ of the torsional vibration modes Tuj having respectively odd vibration mode number and/or between the radial vibration frequencies $f_{Rei}$ of the radial vibration modes Rei and the torsional vibration frequencies $f_{Tej}$ of the torsional vibration modes Tej having respectively even vibration mode number is enlarged in relation to the comparison pneumatic tire.

It is to be noted again at this point that a consideration of frequency intervals $\Delta$fuiej and/or $\Delta$feiuj is also possible and is also comprised by the present invention, i.e., the consideration of frequency intervals between Rui and Tej and/or between Rei and Tuj. However, the inventors have found that a substantial improvement of the vibration behavior of the pneumatic tire with the effect desired in the meaning of the invention may already be achieved with the consideration of the frequency intervals $\Delta$fuij and/or $\Delta$feij alone.

The at least one determined frequency interval $\Delta$fuab and/or $\Delta$feab is very particularly preferably selected from the ascertained frequency intervals $\Delta$fuij, $\Delta$feij, which are only relatively small in the comparison pneumatic tire, for example, in the range of a few hertz, for example, within a frequency range from approximately 0 Hz to fewer than approximately 10 Hz, in particular less than approximately 5 Hz. By way of the modified formation and/or arrangement of the at least one construction element in the pneumatic tire according to the invention, this determined frequency interval $\Delta$fuab and/or $\Delta$feab is then particularly preferably enlarged to a value greater than 5 Hz. This case is illustrated by way of example in the view (b) of FIG. 4. A mutual energy transfer between the radial vibration modes and the torsional vibration modes having respectively odd vibration modes and/or the radial vibration modes and the torsional vibration modes having respectively even vibration modes is substantially suppressed in this way, which is surprisingly accompanied by the advantageous effect described herein with respect to the vibration behavior of the pneumatic tire according to the invention.

Specific modifications of construction elements to achieve the effect according to the invention on a pneumatic tire according to the invention are proposed hereafter on the basis of FIGS. 5 to 12. All different embodiments of the invention explained in FIGS. 5 to 12 in conjunction with the description may also be combined with one another as desired, of course, and represent still further embodiments of the pneumatic tire according to the invention, which are also comprised by the present invention, even if the description of each following embodiment of the pneumatic tire according to the invention respectively only has the modification of a single construction element as the subject matter.

FIG. 5 schematically shows, in view (a), a comparison pneumatic tire 28 having a construction element 29 to be modified, in view (b), an exemplary embodiment of a pneumatic tire 30 according to the invention having a construction element 31 modified in relation to the comparison pneumatic tire from view (a), and, in view (c), two graphs to illustrate the frequency shift $\Delta$f of radial vibration frequencies $f_{Rui}$, $f_{Rei}$ and torsional vibration frequencies $f_{Tuj}$, $f_{Tej}$ of corresponding radial or torsional vibration modes Rui, Rei, Tuj, Tej, respectively, as a result of the modified construction element 31 shown in view (b).

It is to be understood that both the comparison pneumatic tire 28 and also the pneumatic tire 30 according to the invention can have the construction elements 4-7 and 12-16 of the type described in conjunction with FIG. 1. In addition, in FIG. 5, a comparison belt structure having at least one comparison belt ply 29 can be seen in the comparison pneumatic tire 28 and a belt structure having at least one belt ply 31 can be seen in the pneumatic tire 30 according to the invention. Both the comparison belt structure of the comparison pneumatic tire 28 and also the belt structure of the pneumatic tire 30 according to the invention are each incorporated between the tread band 4 and the carcass structure (see FIG. 1) so as to coaxially enclose the latter. Furthermore, comparison belt cords 32 of the at least one comparison belt ply 29 and belt cords 33 of the at least one belt ply 31 are shown in FIG. 5. The comparison belt cords 32 of the comparison belt ply 29 have a first running angle $\alpha 1$ in relation to the tire main plane 3 and the belt cords 33 of the belt ply 31 have a second running angle $\alpha 2$ in relation to the tire main plane 3. Both running angles $\alpha 1$ and $\alpha 2$ each correspond to the acute angle enclosed in each case by the belt cords 32 or 33, respectively, with the tire main plane 3, as shown in each of the views (a) and (b) of FIG. 5.

Figures 5A, 5B:
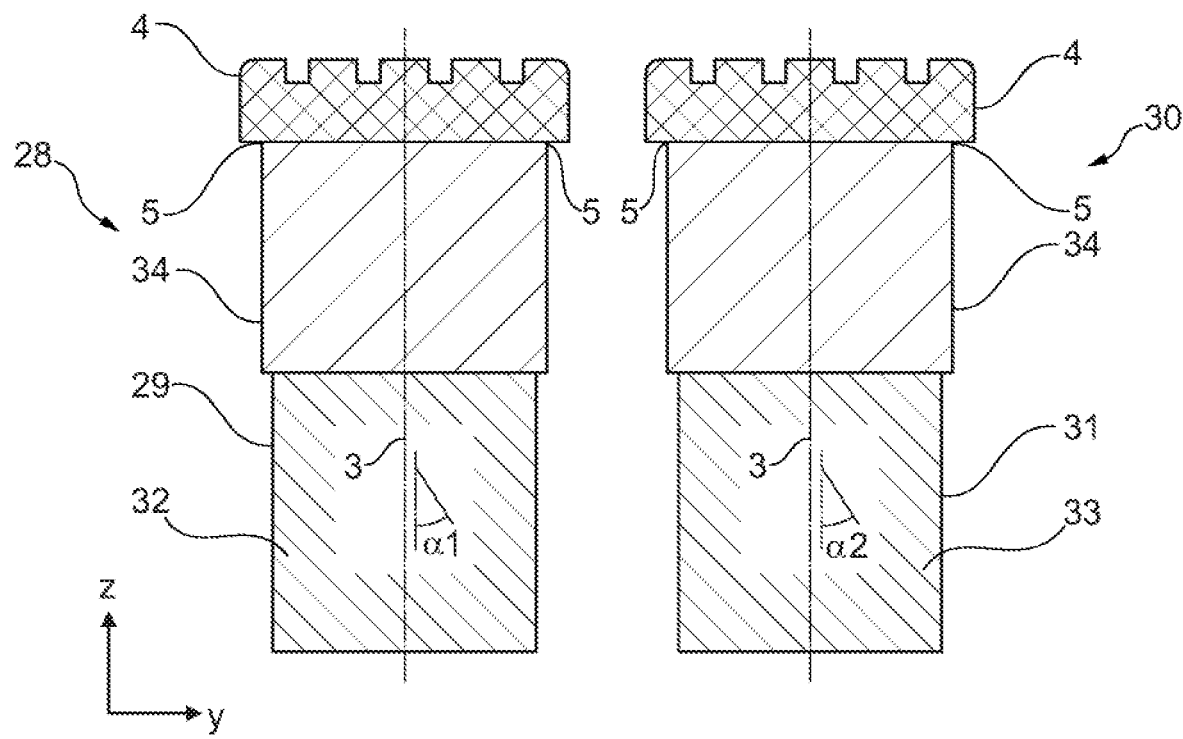
FIG. 5A shows a comparison pneumatic tire having a construction element to be modified.
FIG. 5B shows an exemplary embodiment of a pneumatic tire according to the invention having a construction element modified in relation to the comparison pneumatic tire from FIG. 5A.

In addition, in FIGS. 5(a) and 5(b), in both pneumatic tires 28 and 30, a belt cover ply structure having at least one belt cover ply 34 can be inferred, which is incorporated in each case between the tread band 4 and the comparison belt structure or belt structure having at least one comparison belt ply 29 or belt ply 31, respectively, in each case in a manner coaxially enclosing the belt structure. The belt cover ply 34 extends essentially in its width torsionally to the tire main plane 3 between the tire shoulders 5 of the comparison pneumatic tire 28 or pneumatic tire 30, respectively.

The difference between the construction elements 29 and 31 of the comparison pneumatic tire 28 and the pneumatic tire 30 according to the invention in the exemplary embodiment illustrated in FIG. 5 is that the running angle $\alpha 2$ of the belt cords 33 of the belt ply 31 of the pneumatic tire 30 is less than the running angle $\alpha 1$ of the comparison belt cord 32 of the comparison belt ply 29 of the comparison pneumatic tire 28. In particular, the running angle $\alpha 1$ is approximately 27° in the comparison pneumatic tire 28 illustrated in FIG. 5(a) and is approximately 25° in the pneumatic tire 30 according to the invention illustrated in FIG. 5(b).

In view (c) of FIG. 5, the resultant frequency shifts $\Delta$f in the pneumatic tire 30 according to the invention in comparison to the comparison pneumatic tire 28 as a result of the modified belt ply 31 are plotted in Hz (ordinate) of both the radial vibration frequencies $f_{Rui}$, $f_{Rei}$ in Hz of the respective radial vibration modes Rui, Rei and also the torsional vibration frequencies $f_{Tuj}$, $f_{Tej}$ in Hz of the respective torsional vibration modes Tuj, Tej. The radial vibration modes Rui, Rei are shown in view (c) as circular dots, the torsional vibration modes Tuj, Tej as square dots. From left to right in each case, i.e., from low frequencies f to higher frequencies f, in succession in the radial vibration modes Rui, Rei, the first with odd vibration mode number Ru1, the first with even vibration mode number Re1, the second with odd vibration mode number Ru2, the second with even vibration mode number Re2, etc. are plotted. A similar sequence occurs for the torsional vibration modes Tuj, Tej, i.e., from left to right, firstly Tu1, then Te1, Tu2, Te2, etc. For the sake of comprehensibility, in the view (c) of FIG. 5, only the respective first two odd and even radial or torsional vibration modes are explicitly identified.

Figures 10A, 10B:
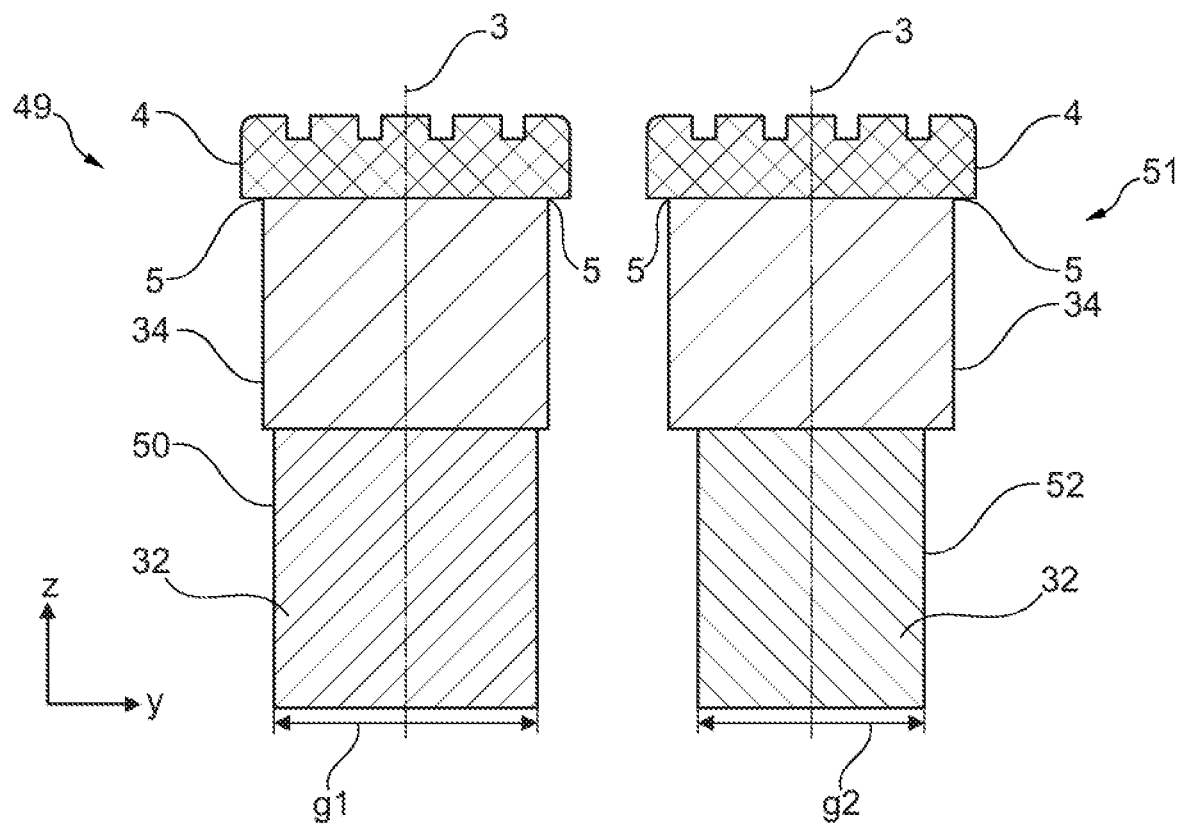
FIG. 10A shows a comparison pneumatic tire having a further construction element to be modified.
FIG. 10B shows an exemplary embodiment of a pneumatic tire according to the invention having a construction element modified in relation to the comparison pneumatic tire from FIG. 10A.
Figure 10C:
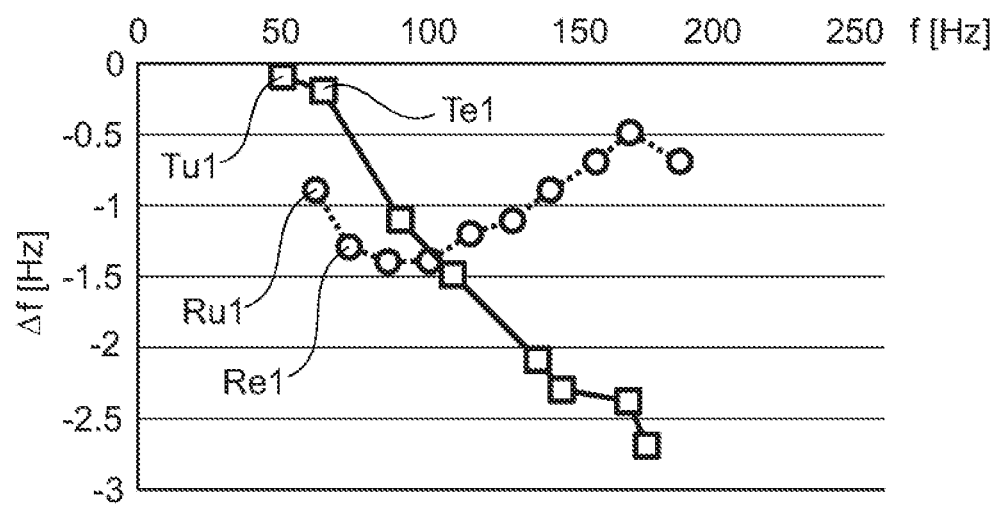
FIG. 10C shows two graphs to illustrate the frequency shift of radial vibration frequencies and torsional vibration frequencies as a result of the modified construction element illustrated in FIG. 10B.
Figure 11:
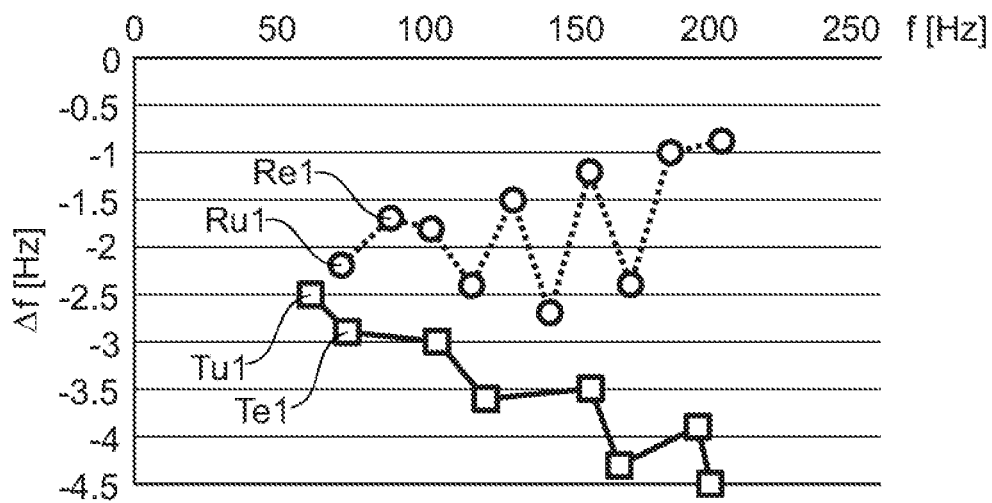
FIG. 11 shows two graphs to illustrate the frequency shift of radial vibration frequencies and torsional vibration frequencies as a result of a further modified construction element of a further exemplary embodiment of a pneumatic tire according to the invention.
Figure 12:
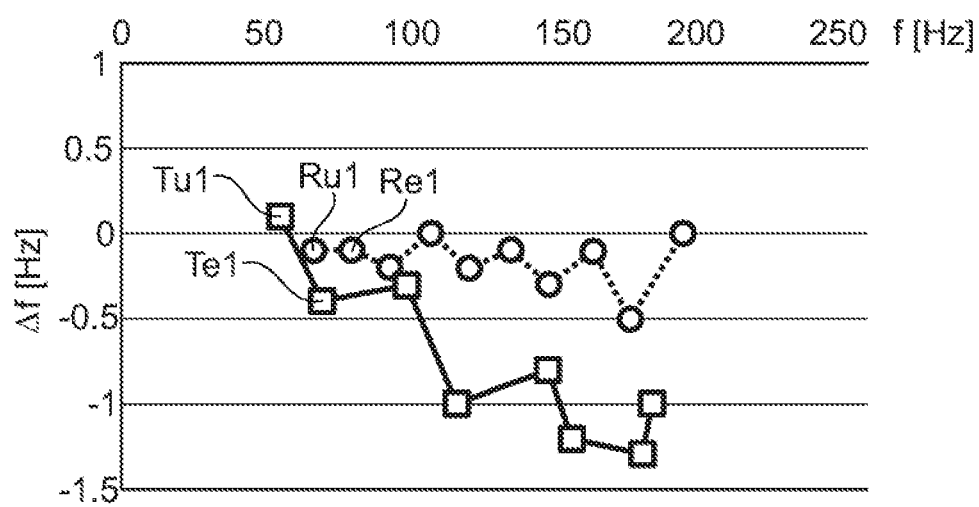
FIG. 12 shows two graphs to illustrate the frequency shift of radial vibration frequencies and torsional vibration frequencies as a result of a further modified construction element of a further exemplary embodiment of a pneumatic tire according to the invention.

Moreover, this arrangement and sequence of the radial and torsional vibration modes Rui, Rei or Tuj, Tij respectively applies similarly to the views (c) of following FIGS. 6-10, and to FIGS. 11 and 12 and for view (c) of FIG. 14, even if they are not completely identified or are not explicitly identified at all in those figures for reasons of a more comprehensible illustration.

Figure 5C:
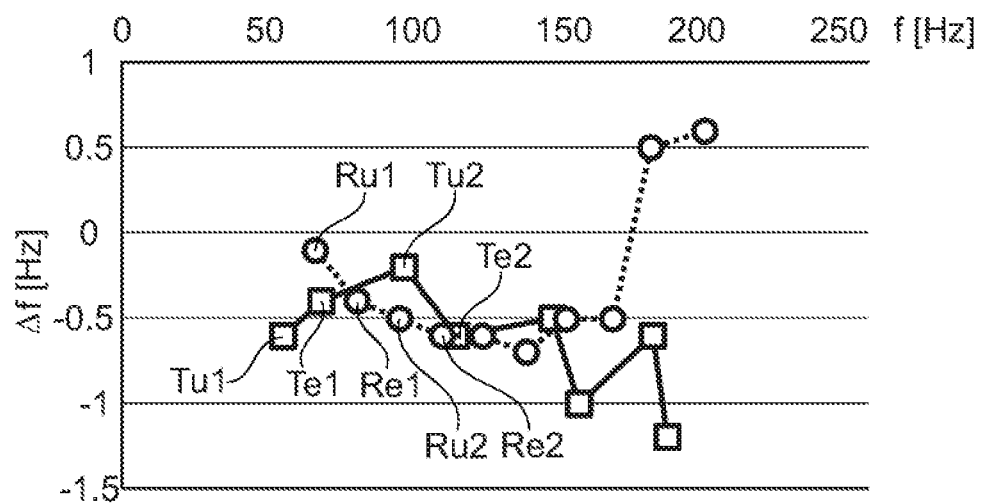
FIG. 5C shows two graphs to illustrate the frequency shift of radial vibration frequencies and torsional vibration frequencies as a result of the modified construction element illustrated in FIG. 5B.

It can be clearly inferred from FIG. 5(c) that solely due to the modified arrangement of the belt cords 33 in the at least one belt ply 31 ($\alpha 2 < \alpha 1$), in particular in the frequency range between approximately 175 Hz and approximately 200 Hz, an increase of the radial vibration frequencies $f_{Rui}$, $f_{Rei}$ may be achieved in comparison to the torsional vibration frequencies $f_{Tuj}$, $f_{Tej}$ and thus an enlargement of at least one determined frequency interval $\Delta$fuxy and/or $\Delta$fexy of the frequency intervals $\Delta$fuij and $\Delta$feij in the manner described herein with the advantageous effect disclosed herein, wherein the at least one determined frequency interval $\Delta$fuxy and/or $\Delta$fexy is preferably less than 5 Hz in the comparison pneumatic tire 28 and is enlarged to at least 5 Hz in the pneumatic tire 30 according to the invention.

FIG. 6 shows, in view (a), the comparison pneumatic tire 28 from FIG. 5(a) with the construction element 29 to be modified, in view (b), an exemplary embodiment of a pneumatic tire 35 according to the invention having a construction element 36 modified in relation to the comparison pneumatic tire 28 from view (a), and in view (c), two graphs to illustrate the frequency shift $\Delta$f of radial vibration frequencies $f_{Rui}$, $f_{Rei}$ and torsional vibration frequencies $f_{Tuj}$, $f_{Tej}$ of corresponding radial or torsional vibration modes Rui, Rei, Tuj, Tej, respectively, as a result of the modified construction element 36 illustrated in view (b), wherein the construction element 36 to be modified corresponds to a belt ply 36 of a belt structure of the pneumatic tire 35.

The belt ply 36 of the pneumatic tire 35 illustrated in FIG. 6(b) essentially corresponds to the belt ply 31 of the pneumatic tire 30 illustrated in FIG. 5(b) with the single exception that a running angle $\alpha 3$ of belt cords 37 of the belt ply 36 in relation to the tire main plane 3 is greater than the running angle $\alpha 1$ of the comparison belt cords 32 of the comparison belt ply 29 of the comparison pneumatic tire 28 illustrated in view (a). In particular, the running angle $\alpha 1$ is approximately 27° in the comparison pneumatic tire 28 illustrated in view (a) and is approximately 29° in the pneumatic tire 35 according to the invention illustrated in view (b) of FIG. 6.

As can be inferred from the view (c) of FIG. 6, the running angle $\alpha 3$ ($\alpha 3 > \alpha 1$) modified in this manner results in significantly smaller torsional vibration frequencies $f_{Tuj}$, $f_{Tej}$ in relation to the radial vibration frequencies $f_{Rui}$, $f_{Rei}$ in the frequency range from approximately 50 Hz to approximately 200 Hz and thus an enlargement of at least one determined frequency interval $\Delta$fuxy and/or $\Delta$fexy of the frequency intervals $\Delta$fuij and $\Delta$feij in the manner described herein with the advantageous effect disclosed herein, wherein the at least one determined frequency interval $\Delta$fuxy and/or $\Delta$fexy is preferably less than 5 Hz in the comparison pneumatic tire 28 and is enlarged to at least 5 Hz in the pneumatic tire 35 according to the invention.

FIG. 7 illustrates, in view (a), a comparison tire bead 38 in cross section of a comparison pneumatic tire (not shown further) having a further construction element 39 to be modified, in view (b), a tire bead 40 in cross section of an exemplary embodiment of a pneumatic tire according to the invention (not shown in greater detail) having a construction element 41 modified in relation to the construction element 39 of the comparison pneumatic tire from view (a), and in view (c), two graphs to illustrate the frequency shift $\Delta$f of radial vibration frequencies $f_{Rui}$, $f_{Rei}$ and torsional vibration frequencies $f_{Tuj}$, $f_{Tej}$ of corresponding radial and torsional vibration modes Rui, Rei, Tuj, Tej, respectively, as a result of the modified construction element 41 illustrated in view (b). The two construction elements 39 and 41 correspond in type to a bead wedge, for example, the bead wedge 16 of the pneumatic tire 1 illustrated in FIG. 1.

Figures 7A, 7B, 7C:
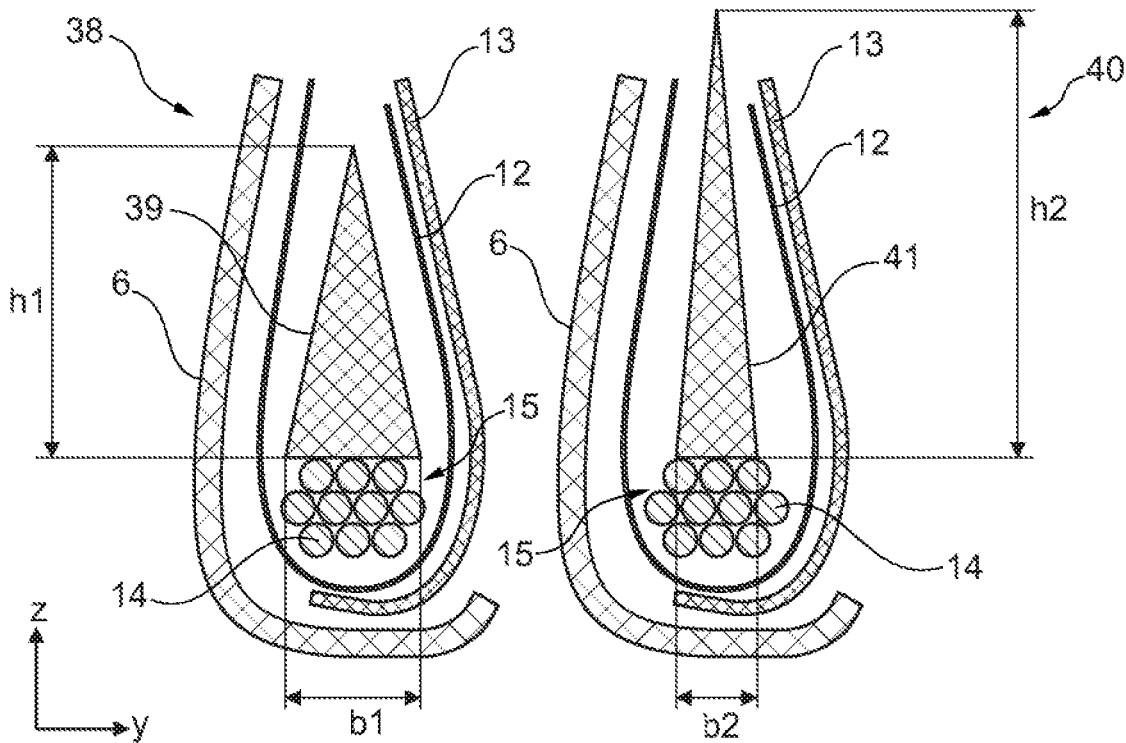
FIG. 7A shows a tire bead in cross section of a comparison pneumatic tire having a further construction element to be modified.
FIG. 7B shows a tire bead in cross section of an exemplary embodiment of a pneumatic tire according to the invention having a construction element modified in relation to the comparison pneumatic tire from FIG. 7A.
FIG. 7C shows two graphs to illustrate the frequency shift of radial vibration frequencies and torsional vibration frequencies as a result of the modified construction element illustrated in FIG. 7B.

As can be inferred from FIGS. 7(a) and 7(b), the comparison bead wedge 39 of the comparison tire bead 38 of the comparison pneumatic tire has a width b1 (axial or y spatial direction) and a height h1 (radial or z spatial direction). The bead wedge 41 of the tire bead 40 of the pneumatic tire according to the invention has a width b2 (axial or y spatial direction) and a height h2 (radial or z spatial direction).

It can be clearly inferred from FIGS. 7(a) and (b) that in the illustrated exemplary embodiment of the pneumatic tire according to the invention, its bead wedge 41 has a lesser width b2 than the comparison bead wedge 39 of the comparison tire bead 38 having the width b1, but a greater height h2 than the comparison bead wedge 39 of the comparison tire bead 38 having the height h1.

As can be inferred well from the view (c) of FIG. 7, a substantial spreading, i.e., a greater frequency interval, of the radial vibration frequencies $f_{Rui}$, $f_{Rei}$ and torsional vibration frequencies $f_{Tuj}$, $f_{Tej}$ of corresponding radial or torsional vibration modes Rui, Rei, Tuj, Tej, respectively, may be achieved by this modification of the bead wedge 41, in particular in the frequency range from approximately 50 Hz to approximately 180 Hz having the advantageous effect disclosed herein. At least one determined frequency interval $\Delta$fuxy and/or $\Delta$fexy, which is preferably less than 5 Hz in the comparison pneumatic tire having the comparison tire bead 38, may be enlarged in this way in the pneumatic tire according to the invention having the tire bead 40, preferably to at least 5 Hz.

Figures 8A, 8B:
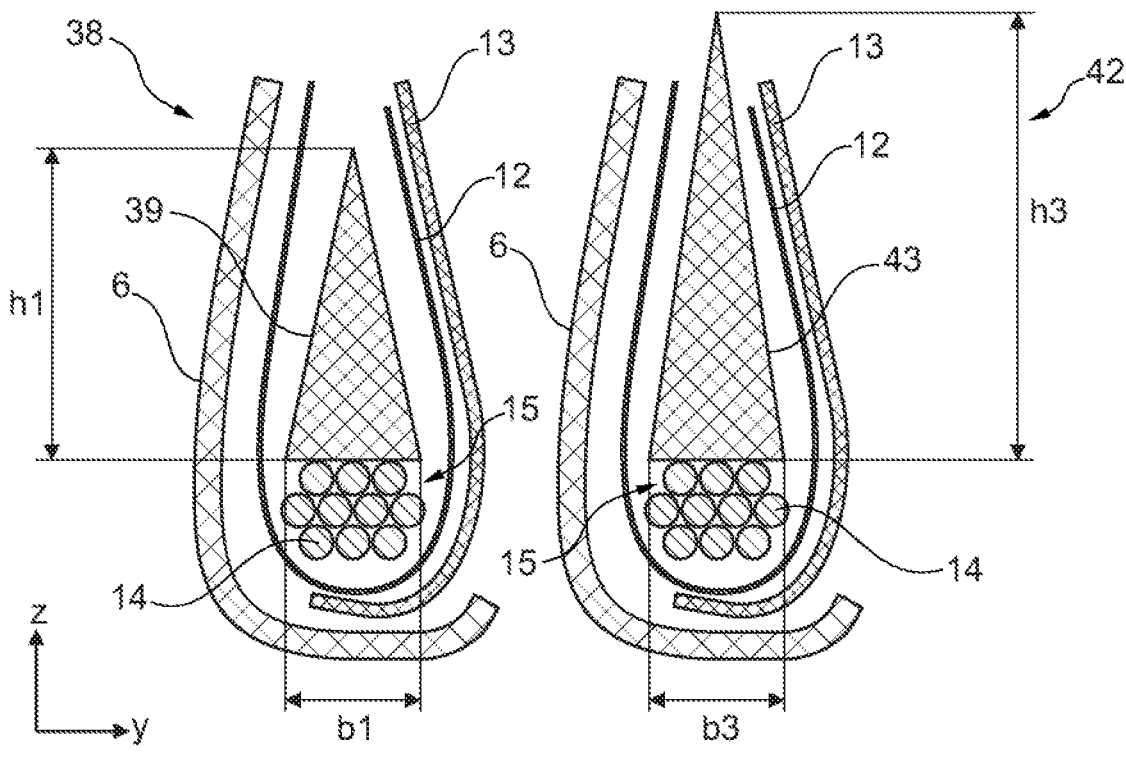
FIG. 8A shows the tire bead of the comparison pneumatic tire from FIG. 7A having the construction element to be modified.
FIG. 8B shows a tire bead in cross section of an exemplary embodiment of a pneumatic tire according to the invention having a construction element modified in relation to the comparison pneumatic tire from FIG. 8A.

FIG. 8 illustrates, in view (a), the tire bead 38 of the comparison pneumatic tire (not shown in greater detail) from FIG. 7(a) having the construction element 39 to be modified, in view (b), a tire bead 42 in cross section of an exemplary embodiment of a pneumatic tire (not shown in greater detail) according to the invention having a construction element 43 modified in relation to the comparison pneumatic tire from view (a), and, in view (c), two graphs to illustrate the frequency shift $\Delta$f of radial vibration frequencies $f_{Rui}$, $f_{Rei}$ and torsional vibration frequencies $f_{Tuj}$, $f_{Tej}$ of corresponding radial or torsional vibration modes Rui, Rei, Tuj, Tej, respectively, as a result of the modified construction element 43 illustrated in view (b). The construction elements 39 and 43 each correspond in type to a bead wedge.

As can be inferred from a comparison of the illustrations of the views (a) and (b) of FIG. 8, both a width b3 of the bead wedge 43 and also a height h3 of the bead wedge 43 of the tire bead 42 of the exemplary embodiment of the pneumatic tire according to the invention are selected as greater than the width b1 and the height h1 of the comparison bead wedge 39 of the comparison tire bead 38 of the comparison pneumatic tire.

Figure 8C:
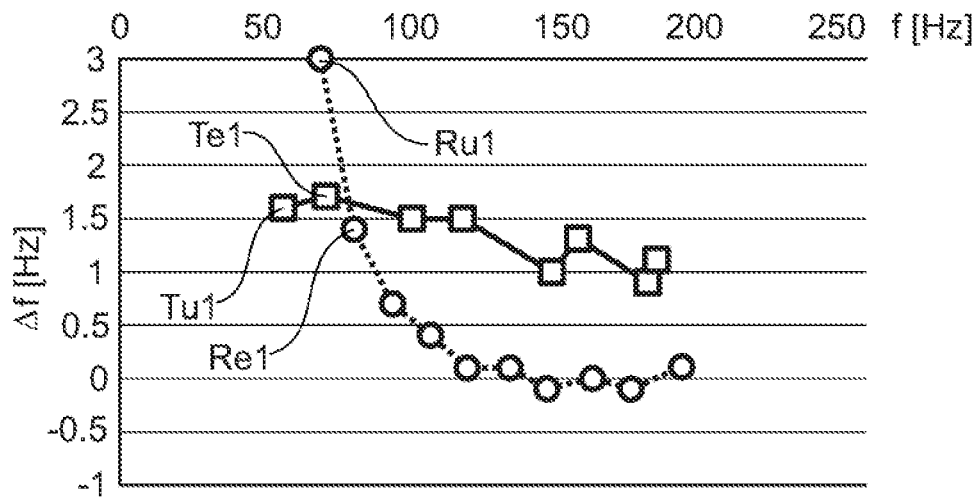
FIG. 8C shows two graphs to illustrate the frequency shift of radial vibration frequencies and torsional vibration frequencies as a result of the modified construction element illustrated in FIG. 8B.

As shown in FIG. 8(c), a significant reduction of the radial vibration frequencies $f_{Rui}$, $f_{Rei}$ of the corresponding radial vibration modes Rui, Rei may be achieved by this modification in comparison to the torsional vibration frequencies $f_{Tuj}$, $f_{Tej}$ of the torsional vibration modes Tuj, Tej in the frequency range between approximately 80 Hz and approximately 200 Hz with the effect disclosed herein. The first radial vibration mode Ru1 having odd vibration mode number, in contrast, shows a significant increase of its vibration frequency $f_{Rui}$ in relation to the torsional vibration frequencies $f_{Tuj}$, $f_{Tej}$ of the torsional vibration modes Tuj, Tej in the frequency range below approximately 75 Hz, which also results, however, in a substantially enlarged frequency interval Δfu11 between the radial vibration frequency $f_{Ru1}$ and the torsional vibration frequency $f_{Tu1}$ with the advantage described herein. In this manner, at least one determined frequency interval Δfuxy and/or Δfexy, which is preferably less than 5 Hz in the comparison pneumatic tire having the comparison tire bead 38, may be enlarged, preferably to at least 5 Hz, in the pneumatic tire according to the invention having the tire bead 42.

FIG. 9 illustrates, in view (a), a comparison pneumatic tire 44 having a further construction element 45 to be modified, in view (b), an exemplary embodiment of a pneumatic tire 46 according to the invention having a construction element 47 modified in relation to the comparison pneumatic tire 44 from view (a), and in view (c), two graphs to illustrate the frequency shift Δf of radial vibration frequencies $f_{Rui}$, $f_{Rei}$ and torsional vibration frequencies $f_{Tuj}$, $f_{Tej}$ of corresponding radial or torsional vibration modes Rui, Rei, Tuj, Tej, respectively, as a result of the modified construction element 47 illustrated in view (b). The construction elements 45 and 47 correspond in the type thereof to a belt cover ply structure (comparison belt cover ply structure of the comparison pneumatic tire 44 and belt cover ply structure of the pneumatic tire 46) having at least one belt cover ply (comparison belt cover ply 45 of the comparison pneumatic tire 44 and belt cover ply 47 of the pneumatic tire 46), which, both in the comparison pneumatic tire 44 and also in the pneumatic tire 46 according to the invention, is respectively incorporated between the tread band 4 and the belt structure having at least one belt ply 29 having belt cords 32 so as to coaxially enclose the latter. As can be inferred from views (a) and (b) of FIG. 9, the comparison belt cover ply 45 and also the belt cover ply 47 extend in the widths thereof torsionally to the tire main plane 3 between the tire shoulders 5 of the comparison pneumatic tire 44 or the pneumatic tire 46 according to the invention, respectively.

In comparison to the comparison belt cover ply structure of the comparison pneumatic tire 44 having the comparison belt cover ply 45, the belt cover ply structure of the pneumatic tire 46 according to the invention having the belt cover ply 47 has a constant thickness over its entire width, while in contrast the comparison belt cover ply structure of the comparison pneumatic tire 44, in particular the comparison belt cover ply 45 in the region of the tire shoulders 5 of the comparison pneumatic tire 44 here, has a greater thickness than in the region of its middle section adjoining the tire main plane 3, which is illustrated in FIG. 9(a) by two additional belt cover plies 48 of the comparison belt cover ply structure of the comparison pneumatic tire 44 arranged in the region of the tire shoulders 5. The thickness difference of the comparison belt cover ply structure of the comparison pneumatic tire 44 can also be implemented, of course, by corresponding thickness variation over the belt cover ply width of only a single belt cover ply 45. The comparison belt cover ply structure illustrated in FIG. 9(a), however, has a 2-1-2 construction, i.e., two belt cover plies 45, 48 in the region of the tire shoulders and only one belt cover ply 45 in the middle region of the comparison belt cover ply structure of the comparison pneumatic tire 44.

As can be inferred from FIG. 9(c), such a modification of the belt cover ply 47 can be used for the purpose of moving in particular the torsional vibration frequencies $f_{Tu2}$, $f_{Tu3}$, and $f_{Tu4}$ substantially away from one another in relation to the radial vibration frequencies $f_{Ru3}$, $f_{Ru4}$, or $f_{Ru5}$, respectively, in the frequency range between approximately 140 Hz and approximately 200 Hz, and therefore in this manner at least a determined frequency interval Δfuxy and/or Δfexy, which is preferably less than 5 Hz in the comparison pneumatic tire 44, may be enlarged in the pneumatic tire 46 according to the invention, preferably to at least 5 Hz, with the advantageous effect disclosed herein.

FIG. 10 illustrates, in view (a), a comparison pneumatic tire 49 having a further construction element 50 to be modified, in view (b), an exemplary embodiment of a pneumatic tire 51 according to the invention having a construction element 52 modified in relation to the comparison pneumatic tire 49 from view (a), and, in view (c), two graphs to illustrate the frequency shift Δf of radial vibration frequencies $f_{Rui}$, $f_{Rei}$ and torsional vibration frequencies $f_{Tuj}$, $f_{Tej}$ of corresponding radial or torsional vibration modes Rui, Rei, Tuj, Tej, respectively, as a result of the modified construction element 52 illustrated in view (b). The construction elements 50 and 52 correspond in the type thereof to a belt ply of a belt structure (comparison belt ply 50 of the comparison pneumatic tire 49 or belt ply 52 of the pneumatic tire 51, respectively), which is incorporated between the tread band 4 and the carcass structure (not shown in FIG. 10) (see, for example, FIG. 1) so as to coaxially enclose the latter.

As can be inferred from the views (a) and (b) of FIG. 10, the comparison belt ply 50 has a belt width g1 extending torsionally to the tire main plane 3 of the comparison pneumatic tire 49 and the belt ply 52 has a belt width g2 extending torsionally to the tire main plane 3 of the pneumatic tire 51. It can be seen that the belt width g2 of the belt ply 52 of the pneumatic tire 51 according to the invention is selected as less than the belt width g1 of the comparison belt ply 50 of the comparison pneumatic tire 49.

As can be inferred from FIG. 10(c), such a modification of the belt width g2 of the belt ply 52 in relation to the belt width g1 of the comparison belt ply 50 can be used for the purpose of moving the torsional vibration frequencies $f_{Tuj}$, $f_{Tej}$ of the corresponding torsional vibration modes Tuj, Tej, in particular in a frequency range between approximately 130 Hz and approximately 180 Hz, substantially away from the radial vibration frequencies $f_{Rui}$, $f_{Rei}$ of the corresponding radial vibration modes Rui, Rei, and therefore in this manner at least one determined frequency interval Δfuxy and/or Δfexy, which is preferably less than 5 Hz in the comparison pneumatic tire 49, may be enlarged in the pneumatic tire 51 according to the invention, preferably to at least 5 Hz, with the advantageous effect disclosed herein. Below a frequency of approximately 100 Hz, the achievable separation of the radial vibration frequencies $f_{Rui}$, $f_{Rei}$ from the torsional vibration frequencies $f_{Tuj}$, $f_{Tej}$ is somewhat less.

The belt width g2 is preferably reduced in relation to the belt width g1 by approximately 4 mm.

FIG. 11 shows two graphs to illustrate the frequency shift Δf of radial vibration frequencies $f_{Rui}$, $f_{Rei}$ and torsional vibration frequencies $f_{Tuj}$, $f_{Tej}$ of corresponding radial or torsional vibration modes Rui, Rei, Tuj, Tej, respectively, as a result of a further modified construction element (not shown) of a pneumatic tire (also not shown) according to the invention in relation to a comparison pneumatic tire of the prior art (also not shown). The modification relates to at least one side wall, for example, the side wall 6 from FIG. 1, of this pneumatic tire according to the invention, which has a lesser stiffness in comparison to a comparison side wall of the comparison pneumatic tire, i.e., is formed softer. As FIG. 11 shows, in this way, in particular for frequencies above approximately 120 Hz, a clear separation of the radial vibration frequencies $f_{Rui}$, $f_{Rei}$ may be achieved in relation to the torsional vibration frequencies $f_{Tuj}$, $f_{Tej}$ of corresponding radial or torsional vibration modes Rui, Rei, Tuj, Tej, respectively, and therefore in this way at least one determined frequency interval Δfuxy and/or Δfexy, which is preferably less than 5 Hz in the comparison pneumatic tire, may be enlarged in the pneumatic tire according to the invention, preferably to at least 5 Hz, with the advantageous effect disclosed herein.

FIG. 12 shows two graphs to illustrate the frequency shift Δf of radial vibration frequencies $f_{Rui}$, $f_{Rei}$ and torsional vibration frequencies $f_{Tuj}$, $f_{Tej}$ of corresponding radial or torsional vibration modes Rui, Rei, Tuj, Tej, respectively, as a result of a further modified construction element (not shown) of a pneumatic tire (also not shown) according to the invention in relation to a comparison pneumatic tire of the prior art (also not shown). The modification relates to the tread band, for example, the tread band 4 from FIG. 1, of this pneumatic tire according to the invention, which has a lesser stiffness in comparison to a comparison tread band of the comparison pneumatic tire, i.e., is formed softer. As FIG. 12 shows, in this way, in particular for frequencies above approximately 100 Hz, a clear separation of the torsional vibration frequencies $f_{Tuj}$, $f_{Tej}$ may be achieved in relation to the radial vibration frequencies $f_{Rui}$, $f_{Rei}$ of corresponding radial or torsional vibration modes Rui, Rei, Tuj, Tej, respectively, and therefore in this way at least one determined frequency interval Δfuxy and/or Δfexy, which is preferably less than 5 Hz in the comparison pneumatic tire, may be enlarged in the pneumatic tire according to the invention, preferably to at least 5 Hz, with the advantageous effect disclosed herein.

Figure 13:
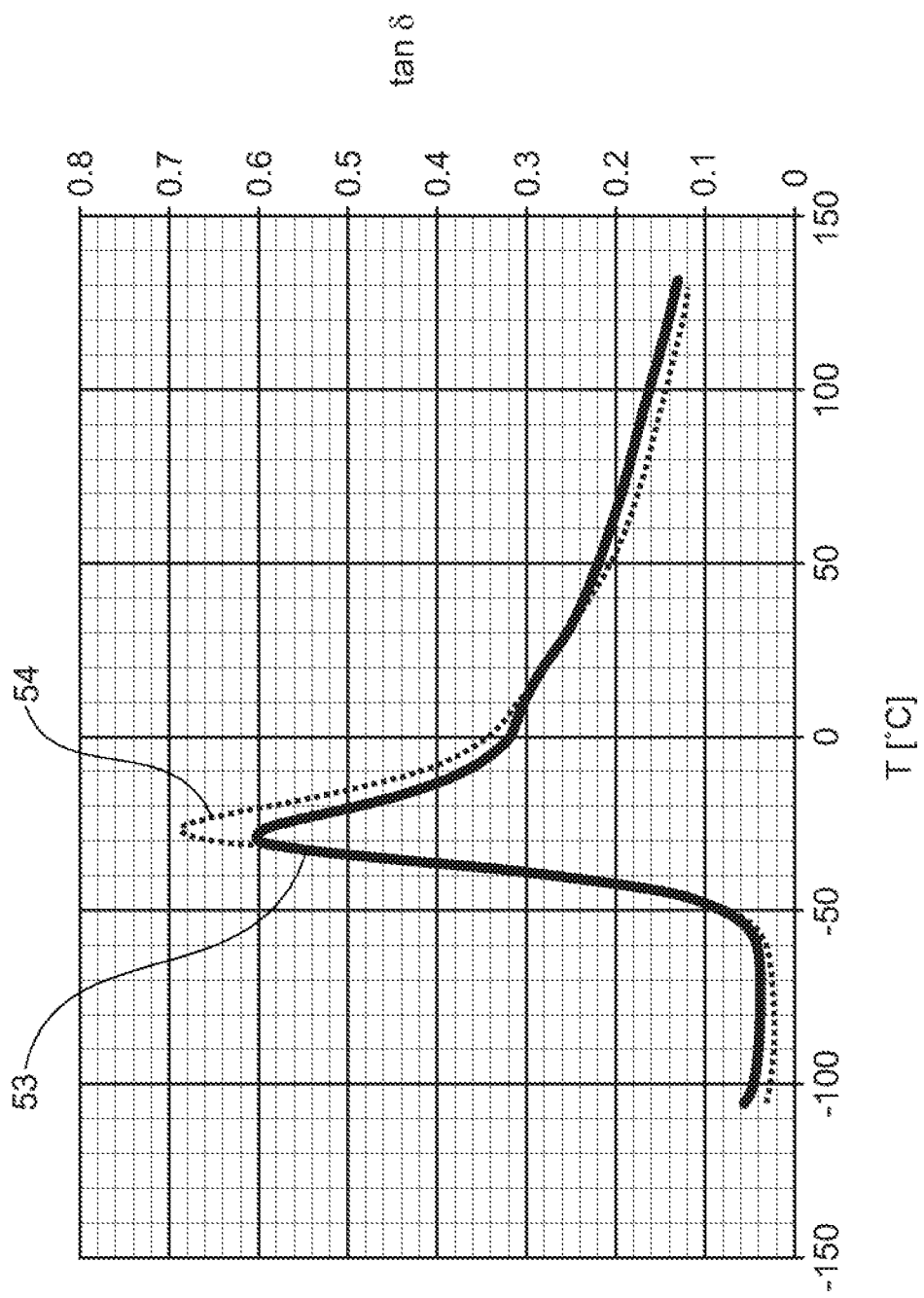
FIG. 13 shows two plots to illustrate the difference between a second rubber material, which is softer than a first rubber material having a first stiffness.

FIG. 13 shows two graphs to illustrate the difference between a second rubber material 54 (graph in FIG. 13 having thin stroke thickness) softer in relation to a first rubber material 53 (graph in FIG. 13 having broad stroke thickness) having a first stiffness. The abscissa represents the temperature T in ° C., the ordinate represents the value of the loss factor tan δ, which is defined in a generally known manner as the quotient of the loss modulus E" and the storage modulus E'. In this case, the energy component (elastic component) recoverable upon a deformation of a viscoelastic material is determined by the dimension of the storage modulus E', while the energy component lost (dissipated) during this procedure is described by the size of the loss modulus E". At the material-specific glass transition temperature of the viscoelastic material, the loss factor tan δ assumes its maximum value.

As can be inferred from FIG. 13, the softer rubber material 54 (lesser stiffness) has a greater loss factor tan δ at its glass transition temperature than the harder rubber material 53 (higher stiffness). Accordingly, the above definitions with respect to the descriptions of FIGS. 11 and 12, that the at least one side wall of an exemplary embodiment of the pneumatic tire according to the invention (FIG. 11) or the tread band of an exemplary embodiment of the pneumatic tire according to the invention (FIG. 12) respectively have a lesser stiffness than the respective corresponding comparison construction feature of a comparison pneumatic tire, may also be defined via the loss factor tan S. As a result, the at least one side wall of the pneumatic tire according to the invention as shown in FIG. 11 has a higher loss factor tan δ at its glass transition temperature than the corresponding comparison side wall of the comparison pneumatic tire. The tread band of the pneumatic tire according to the invention as shown in FIG. 12 also has a higher loss factor tan δ at its glass transition temperature than the corresponding comparison tread band of the comparison pneumatic tire.

FIG. 14 illustrates, in view (a), a comparison pneumatic tire 55 of the prior art having a further construction element 56 to be modified, in view (b), an exemplary embodiment of a pneumatic tire 57 according to the invention having a construction element 58 modified in relation to the comparison pneumatic tire 55 from view (a), and, in view (c), two graphs to illustrate the frequency shift Δf of radial vibration frequencies $f_{Rui}$, $f_{Rei}$ and torsional vibration frequencies $f_{Tuj}$, $f_{Tej}$ of corresponding radial or torsional vibration modes Rui, Rei, Tuj, Tej, respectively, as a result of the modified construction element 58 illustrated in view (b). The construction elements 56 and 58 correspond in the type thereof to a material below the respective tread band 4 (comparison material 56 below the tread band 4 of the comparison pneumatic tire 55 or material 58 below the tread band 4 of the pneumatic tire 57, respectively). As can be inferred from FIG. 14, the respective material 56 or 58 in the corresponding pneumatic tire 55 or 57, respectively, is incorporated between the tread band 4 and the belt cover ply 34 so as to coaxially enclose it.

As can be inferred from the views (a) and (b) of FIG. 14, the comparison material 56 of the comparison pneumatic tire 55 has a thickness d1 illustrated in the view (a) which is less than a thickness d2 of the material 58 of the pneumatic tire 57 according to the invention illustrated in the view (b). The comparison material 56 therefore also has a lower mass than the material 58, if the materials 56 and 58 are identical with respect to the composition thereof.

It can be seen in FIG. 14(c) that the frequency shift Δf of the torsional vibration frequencies $f_{Tuj}$, $f_{Tej}$ of the corresponding torsional vibration modes Tuj, Tej caused by the mass increase of the material 58 of the pneumatic tire 57 has approximately the same absolute value as in the radial vibration frequencies $f_{Rui}$, $f_{Rei}$ of the corresponding radial vibration modes Rui, Rei. Therefore, a modification of the construction element 58 in the pneumatic tire 57 according to the invention illustrated in FIG. 14 in relation to the comparison construction element 56 of the comparison pneumatic tire 55 does only result in a slight enlargement of the frequency intervals Δfuij, Δfeij, for example, from frequencies f above approximately 100 Hz, but this modification of the construction element 58 can especially be used for the purpose of substantially reducing or avoiding vibration resonances between the pneumatic tire 57 according to the invention and a wheel suspension of the vehicle holding it, since the torsional vibration frequencies $f_{Tuj}$, $f_{Tej}$ and the radial vibration frequencies $f_{Rui}$, $f_{Rei}$ of all corresponding torsional or radial vibration modes Tuj, Tej, Rui, Rei, respectively, may be substantially reduced jointly with increasing frequency f, as can be inferred directly from view (c) of FIG. 14.

The increase of the thickness of the material 58 in relation to the comparison material 56 is preferably approximately 0.9 mm, wherein this thickness increase is preferably arranged in a middle region extending around the tire main plane 3 below the tread band 4. It is to be understood that the material 58 can both be formed integrally with the tread band 4, for example, and also separately and can be additionally incorporated between the tread band 4 and, for example, the belt cover ply 34.

The pneumatic tire according to the invention disclosed herein for a vehicle, in particular a motor vehicle, and the method according to the invention disclosed herein for the production thereof is not restricted to the embodiments respectively disclosed herein, but rather also comprises identically acting further embodiments, which result from further combinations compiled in a technically reasonable manner of the technical features described herein of both the pneumatic tire and also its production method.

In a preferred embodiment, the pneumatic tire according to the invention, mounted on a wheel rim, is used as at least one vehicle wheel on a vehicle, in particular on a single-track or multitrack motor vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of improving vibration characteristics of pneumatic tires, comprising:
    performing dynamic testing on a test tire to detect a) respective frequencies of a plurality of radial vibration modes of the test tire, and b) respective frequencies of a plurality of torsional vibration modes of the test tire;
    determining that a first interval between the detected frequency of an even-numbered radial vibration mode and the detected frequency of an even-numbered torsional vibration mode is less than a first threshold, or determining that a second interval between the detected frequency of an odd-numbered radial vibration mode and the detected frequency of an odd-numbered torsional vibration mode is less than a second threshold; and
    manufacturing another tire having same design parameters as the test tire except for a running angle of belt cords relative to a main plane of the another tire such that at least one of the first interval and second interval of the another tire is closer to the respective first threshold and second threshold.

2. The method of claim 1, wherein the first threshold or the second threshold is 5 Hz.

3. A method of manufacturing a pneumatic tire, comprising:
    identifying a first frequency of an even-numbered radial vibration mode of a tire;
    identifying a second frequency of an even-numbered torsional vibration mode of the tire;
    calculating an interval between the first and second frequencies;
    modifying a design parameter of a tire component to increase the interval to above a threshold, wherein the tire component is a belt structure having at least one belt ply, the at least one belt ply having belt cords, and the design parameter is a running angle of the belt cords relative to a main plane; and
    manufacturing another tire with the modified design parameter of the tire component.

4. The method of claim 3, wherein the first threshold and/or the second threshold is 5 Hz.

5. A method of manufacturing a pneumatic tire, comprising:
    identifying a first frequency of a radial vibration mode of a tire;
    identifying a second frequency of a torsional vibration mode of the tire;
    calculating an interval between the first and second frequencies; and
    modifying a design parameter of a tire component to increase the interval to above a threshold, wherein the tire component is a belt structure having at least one belt ply, the at least one belt ply having belt cords, and the design parameter is a running angle of the belt cords relative to a main plane; and
    manufacturing another tire with the modified design parameter of the tire component.

6. The method of claim 5, wherein the threshold is 5 Hz.

7. The method of claim 5, wherein radial vibration mode and the torsional vibration mode are both even-numbered or are both odd-numbered.

* * * * *